(12) United States Patent
Magi et al.

(10) Patent No.: US 10,061,360 B1
(45) Date of Patent: Aug. 28, 2018

(54) HINGE FOR AN ELECTRONIC DEVICE

(71) Applicant: Intel Corporation, Santa Clara, CA (US)

(72) Inventors: Aleksander Magi, Aloha, OR (US); Nicholas W. Oakley, Portland, OR (US); Mark E. Sprenger, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/480,871

(22) Filed: Apr. 6, 2017

(51) Int. Cl.
| | | |
|---|---|---|
| *H05K 7/00* | (2006.01) | |
| *H05K 5/00* | (2006.01) | |
| *G06F 1/16* | (2006.01) | |
| *E05D 3/12* | (2006.01) | |
| *E05D 5/12* | (2006.01) | |

(52) U.S. Cl.
CPC ........... *G06F 1/1681* (2013.01); *E05D 3/122* (2013.01); *E05D 5/12* (2013.01); *G06F 1/1616* (2013.01); *G06F 1/1637* (2013.01); *G06F 1/1662* (2013.01)

(58) Field of Classification Search
CPC .................................................... G06F 1/1616
USPC .................................................... 361/679.56
See application file for complete search history.

(56) References Cited

U.S. PATENT DOCUMENTS

2016/0369546 A1* 12/2016 Zasowski ................ E05F 1/105
2017/0097657 A1* 4/2017 Hampton .............. G06F 1/1616

* cited by examiner

*Primary Examiner* — Jerry Wu
(74) *Attorney, Agent, or Firm* — Patent Capital Group

(57) ABSTRACT

Particular embodiments described herein provide for an electronic device, such as a notebook computer or laptop, that includes a circuit board coupled to a plurality of electronic components (which includes any type of components, elements, circuitry, etc.). One particular example of the electronic device includes a hinge design that includes a first housing pinion that connects to a first housing, a first housing rack coupled to the first housing pinion, a second housing pinion that connects to a second housing, and a second housing rack coupled to the second housing pinion. The first housing rack can be curved and a portion of the first housing pinion can travel along a pinion guide that has approximately the same curved profile as the first housing rack.

21 Claims, 25 Drawing Sheets

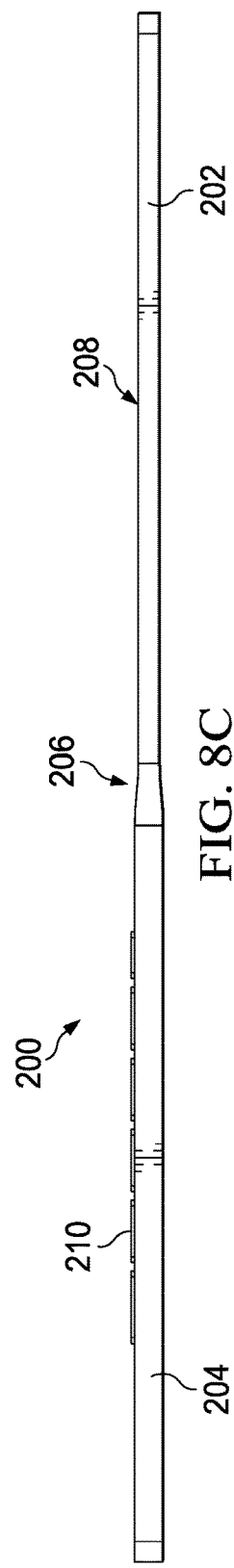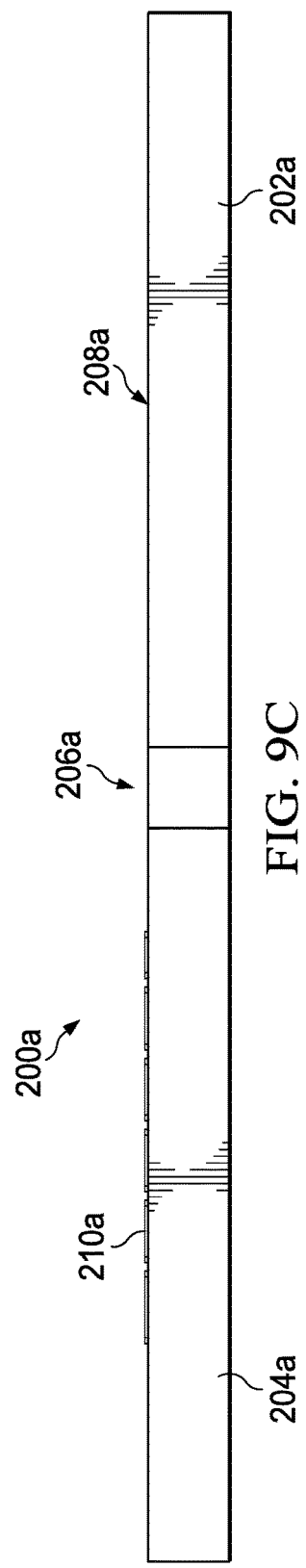

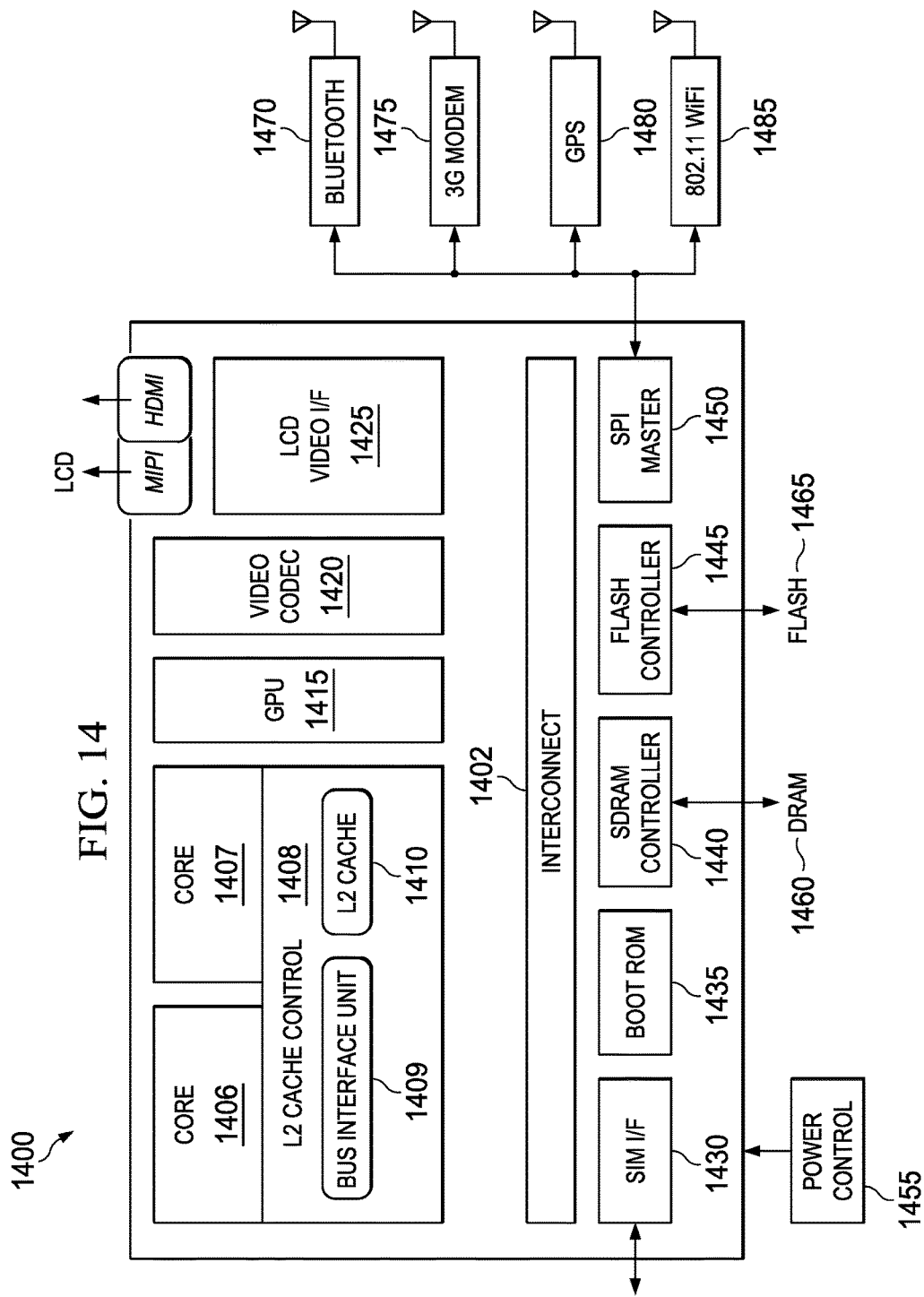

HINGE FOR AN ELECTRONIC DEVICE

FIELD OF THE DISCLOSURE

Embodiments described herein generally relate to the field of electronic devices, and more particularly, to a hinge for an electronic device.

BACKGROUND

End users have more electronic device choices than ever before. A number of prominent technological trends are currently afoot (e.g., more computing devices, more devices that can change into different configurations, etc.), and these trends are changing the electronic device landscape. One of the technological trends is a laptop with a curved display or screen. However, it can be difficult to properly allow for rotation of the curved display or screen relative to a keyboard. Another technological trend is low-profile devices. However, the form factor for a low-profile device is often limited by the hinge.

BRIEF DESCRIPTION OF THE DRAWINGS

Embodiments are illustrated by way of example and not by way of limitation in the FIGURES of the accompanying drawings, in which like references indicate similar elements and in which:

FIG. 8C is a simplified orthographic view illustrating an embodiment of an electronic device in a flat configuration, in accordance with one embodiment of the present disclosure;

FIG. 9C is a simplified orthographic view illustrating an embodiment of an electronic device in a flat configuration, in accordance with one embodiment of the present disclosure;

FIG. 14 is a simplified block diagram associated with an example system on chip (SOC) of the present disclosure.

Figure 1A:
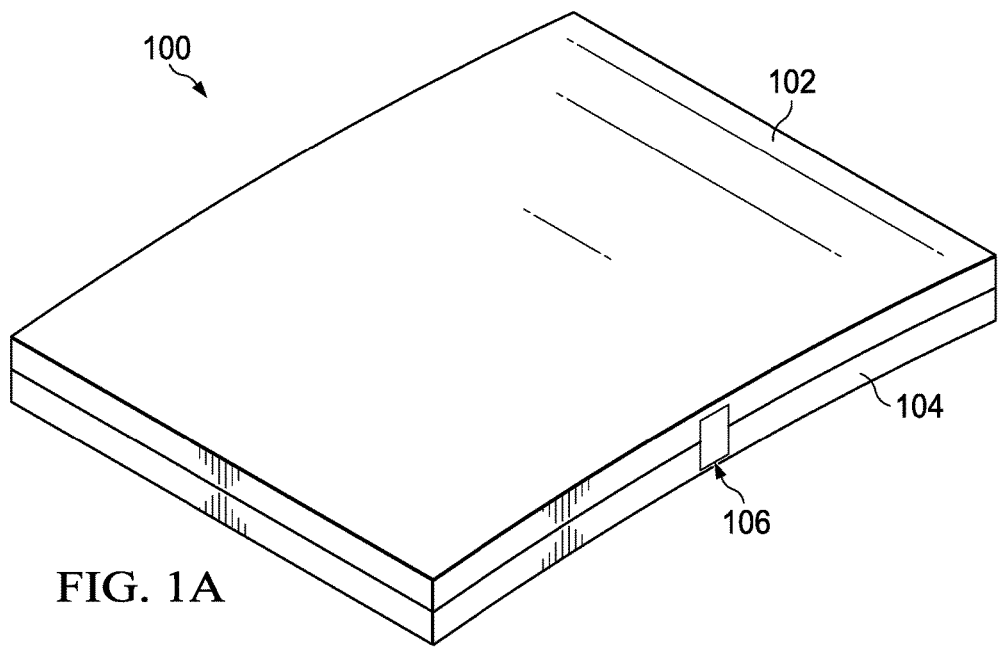
FIG. 1A is a simplified orthographic view illustrating an embodiment of an electronic device in a closed clamshell configuration, in accordance with one embodiment of the present disclosure.

The FIGURES of the drawings are not necessarily drawn to scale, as their dimensions can be varied considerably without departing from the scope of the present disclosure.

DETAILED DESCRIPTION OF THE EMBODIMENTS

Overview

In an example, there is disclosed a system, an apparatus, and a method for a hinge design. In one example embodiment, the hinge can include CLAIMS.

Example Embodiments of the Disclosure

The following detailed description sets forth example embodiments of apparatuses, methods, and systems relating to a hinge for an electronic device. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one material component with respect to other components. For example, one component over or under another component may be directly in contact with the other component or may have one or more intervening components. Moreover, one component disposed between two components may be directly in contact with the two component or may have one or more intervening components. In contrast, a first component "on" a second component is in direct contact with that second component. Similarly, unless explicitly stated otherwise, one feature disposed between two features may be in direct contact with the adjacent features or may have one or more intervening components.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Currently, form-factor limitations for electronic devices such as laptops are addressed by enabling ultra-low-profile and small form-factor components (e.g., coreless package and motherboard, connectors, batteries, etc.). The development of high density super-capacitors is also being used to further reduce the battery form-factor and density to enable low-profile platforms. However, the form factor for a low-profile device is often limited by the hinge.

In some designs, the hinge can be bulky and limit the form-factor of the device. For example, the z-height (height on the z axis of an X, Y, Z, Cartesian coordinate system) of the electron device is often dependent on the hinge design. Further, a laptop with a curved display or screen can provide design challenges, particularly with rotation of the curved display or screen using a mechanical hinge.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

FIG. 1A is a simplified orthogonal view illustrating an embodiment of an electronic device 100 in a closed clamshell configuration, in accordance with one embodiment of the present disclosure. Electronic device 100 can include a first housing 102, a second housing 104, and a hinge 106. Hinge 106 can define an axis of rotation that is shared between first housing 102 and second housing 104. Hinge 106 may be a low-profile hinge. The term low-profile hinge includes a hinge with a low, flat, or relatively flat profile with a low total z-height.

In one or more embodiments, electronic device 100 is a notebook computer or laptop computer. In still other embodiments, electronic device 100 may be any suitable electronic device having a hinge (e.g., hinge 106) such as a mobile device, an audio system, a movie player, etc. In yet another embodiment, hinge 106 may be located in a non-electrical device that allows for the functions of hinge 106 as described herein or is apparent to one skilled in the art.

Figure 1B:
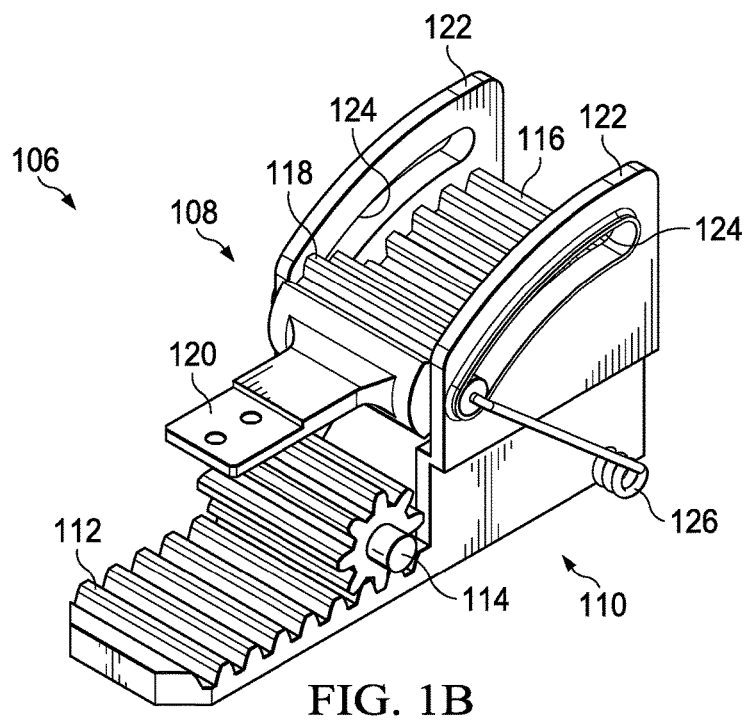
FIG. 1B is a simplified orthographic view illustrating an embodiment of a hinge, in accordance with one embodiment of the present disclosure.

Turning to FIG. 1B, FIG. 1B is a simplified orthographic view of hinge 106, in accordance with an embodiment of the present disclosure. As illustrated in FIG. 1B, hinge 106 can include a first housing attachment 108, a second housing attachment 110, a second housing rack 112, a second housing pinion 114, a first housing rack 116, a first housing pinion 118, a first housing rotation guide 122, and a tension mechanism 126. First housing pinion 118 can include a first housing securing means 120. First housing rotation guide 122 can include a pinion guide 124. Hinge 106 can be coupled to second housing 104 using second housing pinion 114. In addition, hinge 106 can be coupled to first housing 102 using first housing securing means 120. In an example, first housing attachment 108 and second housing attachment 110 can be embedded or surrounded by second housing 104 (e.g., in a chassis or body of second housing 104) such that when first housing 102 is coupled to first housing securing means 120, first housing 102 can be relatively flush with second housing 104 and create a smooth profile.

First housing rack 116 and first housing pinion 118 are tined with each other to create a rack and pinion system. Also, second housing rack 112 and second housing pinion 114 are tined with each other to create a rack and pinion system. First housing rack 116 can have a curved profile. Pinion guide 124 can have approximately the same curved profile as first housing rack 116 and be configured to follow the path of first housing rack 116. As first housing pinion 118 rotates and travels along first housing rack 116, pinion guide 124 can help prevent separation of first housing pinion 118 from first housing rack 116. In some examples, pinion guide 124 can help provide a smooth transition as first housing 102 is rotated relative to second housing 104. Tension mechanism 126 can be configured to help first housing pinion 118 not roll down first housing rack 116 when first housing 102 is rotated relative to second housing 104. This allows first housing 102 to be adjusted by a user to a desired position and remain in a desired position until adjusted or moved by the user. In an example, tension mechanism 126 may be a spring type mechanism. In another example, the amount of tension provided by tension mechanism 126 can be adjusted (e.g., by replacing the spring type mechanism with another spring type mechanism).

Hinge 106 can have a profile such that hinge 106 is enclosed, encased, or at least partially contained within in first housing 102 and second housing 104 when electronic device 100 is in a closed clamshell configuration so most of hinge 106 is not visible. In an example, hinge 106 does not protrude or extend from first housing 102 or second housing 104 such that a smooth profile is created when electronic device 100 is in a closed clamshell configuration. For example, only a back portion of hinge 106 may be visible as illustrated in FIG. 1A.

Figure 2A:
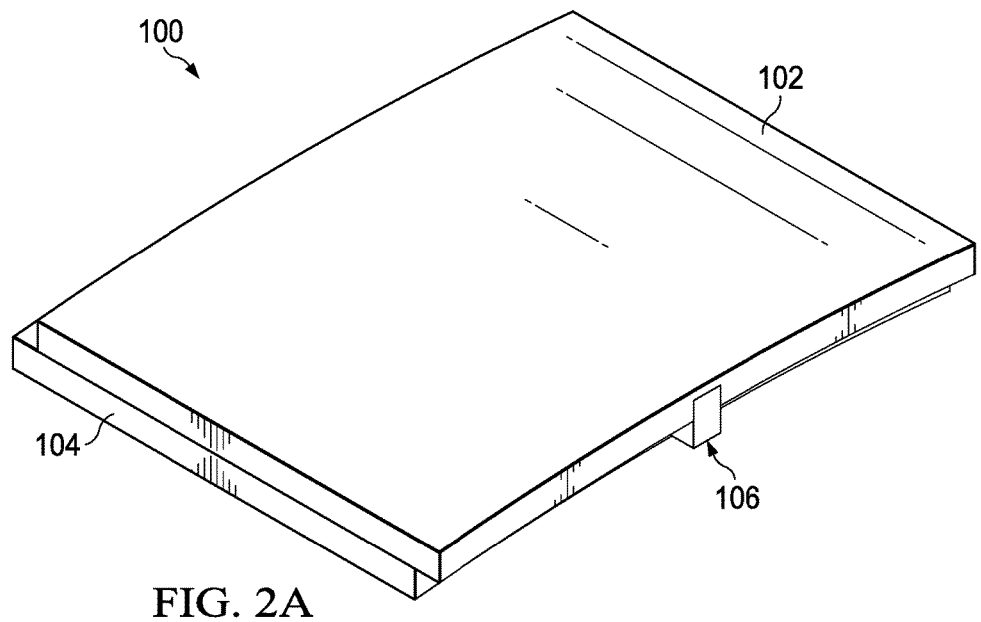
FIG. 2A is a simplified orthographic view illustrating an embodiment of an electronic device in a transitioning configuration, in accordance with one embodiment of the present disclosure.

Turning to FIG. 2A, FIG. 2A is a simplified orthographic view of electronic device 100 in a transitioning configuration, in accordance with an embodiment of the present disclosure. As illustrated in FIG. 2A, first housing 102 has been moved laterally over second housing 104 or has been slid back relative to second housing 104. In an example, if first housing 102 is a curved display (or a display that includes a curved screen), to open electronic device 100 or transition electronic device 100 from a closed laptop configuration to an open configuration, the sides of the curved display need to have room to rotate. In an example, if first housing 102 includes a curved display, second housing 104 may be curved and/or have a profile that matches or mirrors the profile of first housing 102.

Figure 2B:
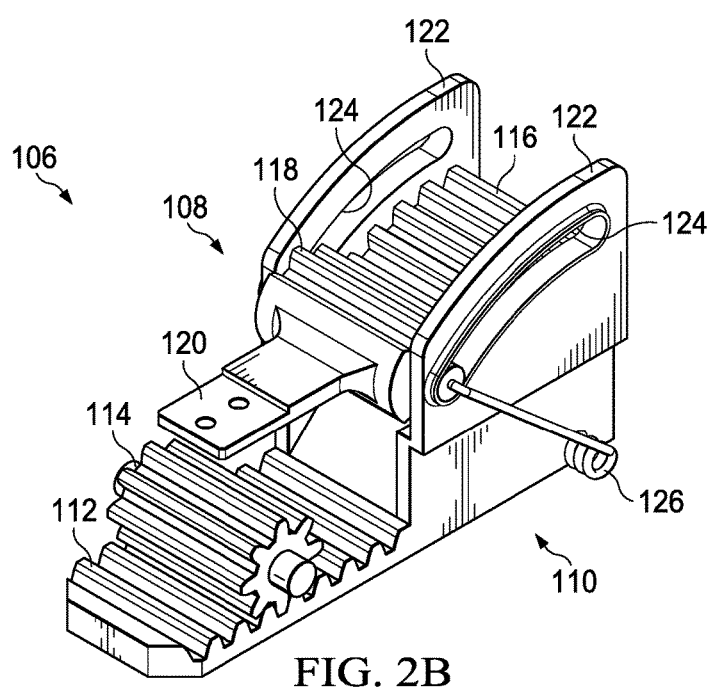
FIG. 2B is a simplified orthographic view illustrating an embodiment of a hinge, in accordance with one embodiment of the present disclosure.
Figure 2C:
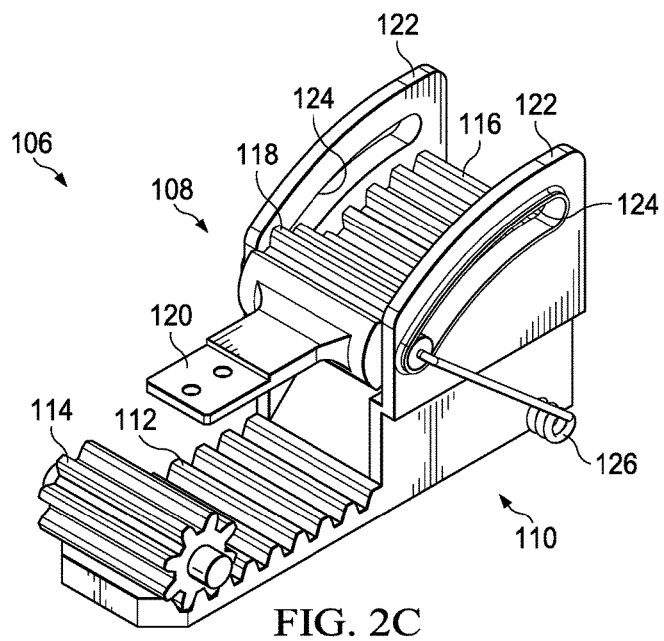
FIG. 2C is a simplified orthographic view illustrating an embodiment of a hinge, in accordance with one embodiment of the present disclosure.

Turning to FIGS. 2B and 2C, FIGS. 2B and 2C are a simplified orthographic view of hinge 106 in a transitioning configuration, in accordance with an embodiment of the present disclosure. As illustrated in FIGS. 2B and 2C, second housing pinion 114 has been rotated or rolled along second housing rack 112. Because second housing 104 is secured to second housing pinion 114, this cause first housing 102 to be moved laterally over second housing 104 or one end of second housing 104 to be moved away from one end of first housing 102 to a position illustrated in FIG. 2A.

Figure 3A:
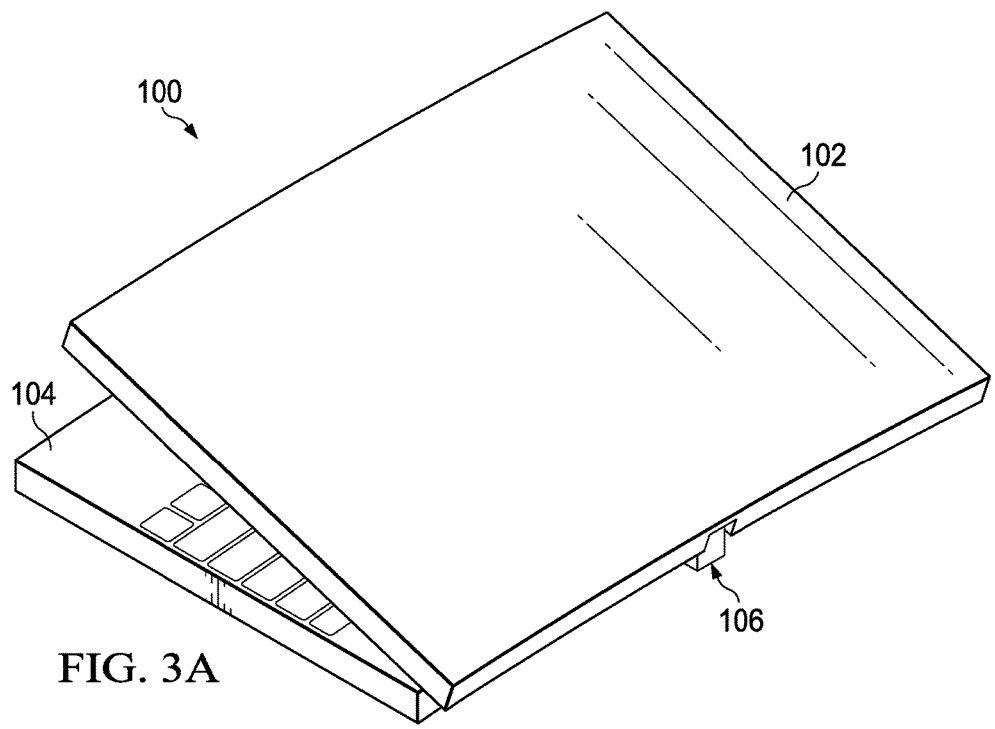
FIG. 3A is a simplified orthographic view illustrating an embodiment of an electronic device in a transitioning configuration, in accordance with one embodiment of the present disclosure.

Turning to FIG. 3A, FIG. 3A is a simplified orthographic view of electronic device 100 in a transitioning configuration, in accordance with an embodiment of the present disclosure. As illustrated in FIG. 3A, first housing 102 has been rotated away from second housing 104 using hinge 106. If first housing 102 includes a curved display, because first housing 102 was moved laterally over second housing 104 or had been slid back relative to second housing 104, the sides of the curved display have room or space to rotate.

Figure 3B:
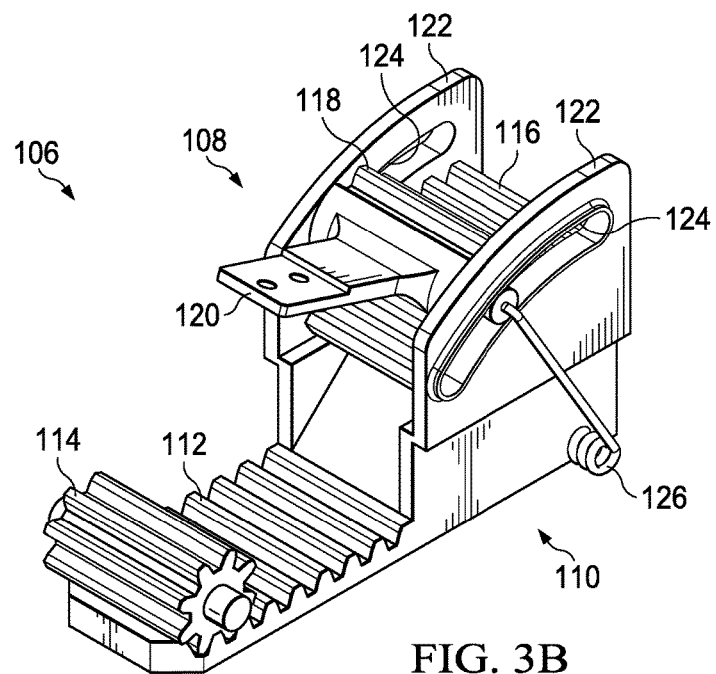
FIG. 3B is a simplified orthographic view illustrating an embodiment of a hinge, in accordance with one embodiment of the present disclosure.

Turning to FIG. 3B, FIG. 3B is a simplified orthographic view of hinge 106 in a transitioning configuration, in accordance with an embodiment of the present disclosure. As illustrated in FIG. 3B, first housing pinion 118 has been rotated and/or rolled along first housing rack 116. Because first housing 102 is secured to first housing securing means 120 on first housing pinion 118, this cause first housing 102 to rotate away from second housing 104 to a position illustrated in FIG. 3A.

Figure 4A:
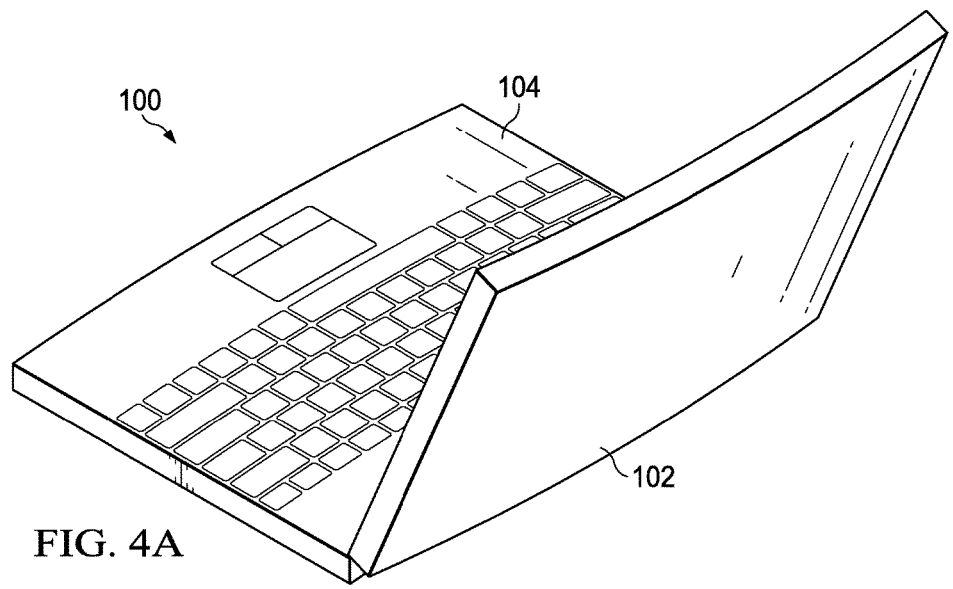
FIG. 4A is a simplified orthographic view illustrating an embodiment of an electronic device in an open clamshell configuration, in accordance with one embodiment of the present disclosure.
Figure 4B:
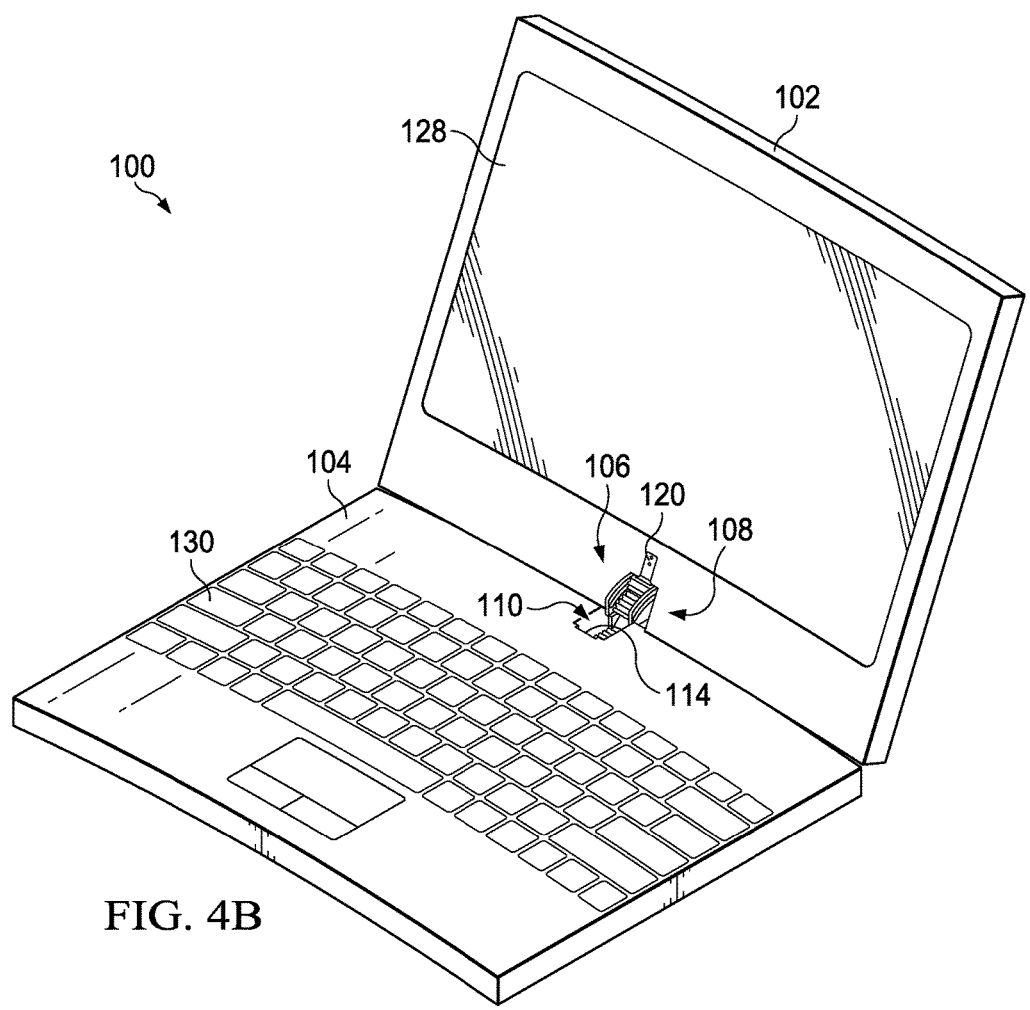
FIG. 4B is a simplified orthographic view illustrating an embodiment of an electronic device in an open clamshell configuration, in accordance with one embodiment of the present disclosure.
Figure 4C:
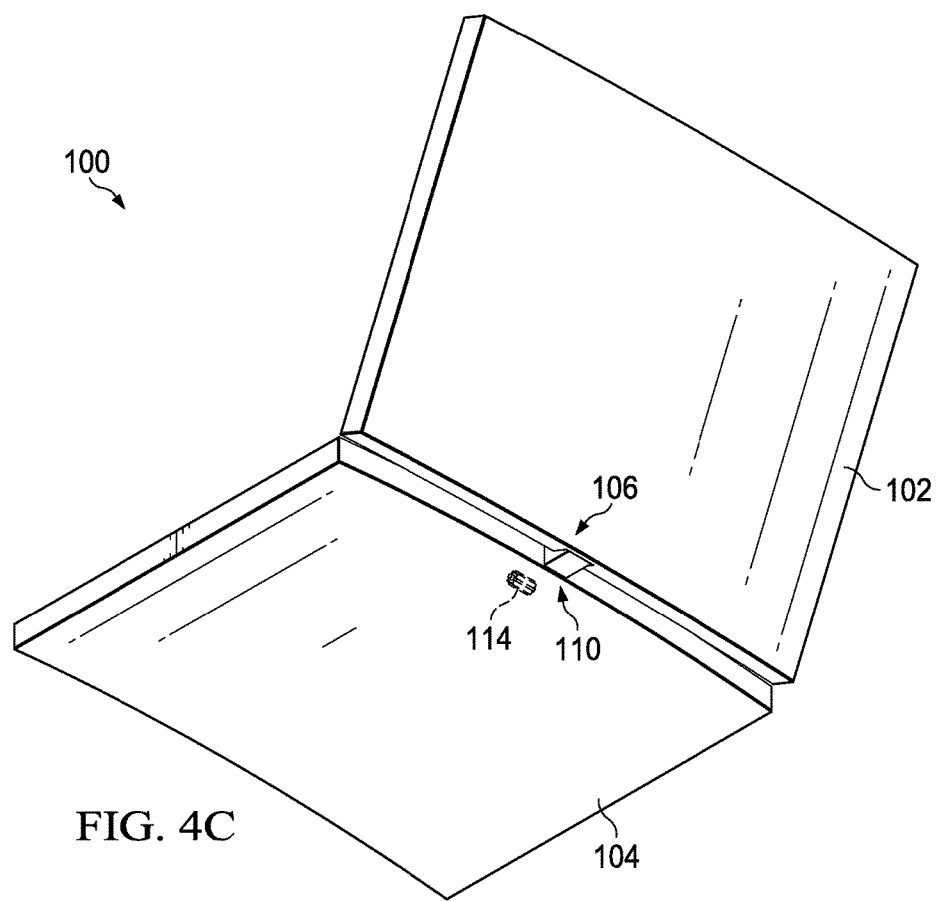
FIG. 4C is a simplified orthographic bottom view illustrating an embodiment of an electronic device in an open clamshell configuration, in accordance with one embodiment of the present disclosure.

Turning to FIGS. 4A-4C, FIGS. 4A-C are a simplified orthographic view of electronic device 100 in an open laptop configuration, in accordance with an embodiment of the present disclosure. As illustrated in FIGS. 4A-4C, first housing 102 has been rotated away from second housing 104 using hinge 106. If first housing 102 includes a curved display, because first housing 102 was moved laterally over second housing 104 or had been slid back relative to second housing 104, the sides of the curved display need to have room or space to rotate.

As illustrated in FIG. 4B, first housing 102 can include a display 128. In one or more embodiments, display 128 can be a curved or flat liquid crystal display (LCD) display screen, light-emitting diode (LED) display screen, organic light-emitting diode (OLED) display screen, plasma display screen, or any other suitable curved or flat display screen system. Display 128 may be a curved or flat touchscreen that can detect the presence and location of a touch within the display area. If display 128 is a curved display, hinge 108 can accommodate the curvature of display 128. In another embodiment, first housing 102 may include a camera, a microphone, and speakers.

In one or more embodiments, second housing 104 can include a keyboard 130 and/or can function as an input device. Second housing 104 may include a mechanical keyboard, touch screen, input area, etc. The touch screen can detect the presence and location of a touch within the touch screen area. In one example, the touch screen can be configured to allow for the input of letters, numbers, characters, functions, etc. similar to a mechanical keyboard and the touch screen may be used in place of (or instead of) a mechanical keyboard. In another example, the touch screen may supplement a mechanical keyboard and may be configured to operate as a number key pad, design area, function call, or some other similar input area.

Figure 4D:
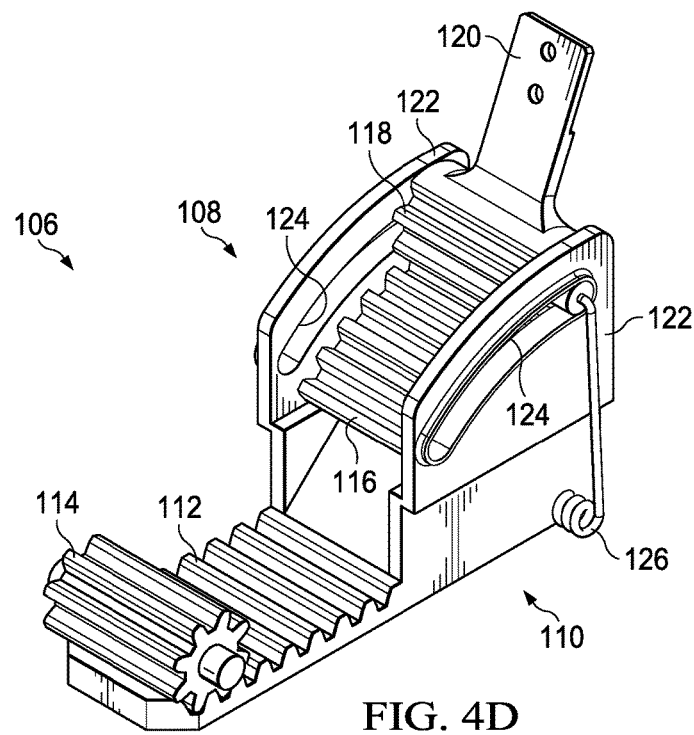
FIG. 4D is a simplified orthographic view illustrating an embodiment of a hinge, in accordance with one embodiment of the present disclosure.

Turning to FIG. 4D, FIG. 4D is a simplified orthographic view of hinge 106 in a transitioning configuration, in accordance with an embodiment of the present disclosure. As illustrated in FIG. 4D, first housing pinion 118 has been rotated and/or rolled along first housing rack 116. Because first housing 102 is secured to first housing securing means 120 on first housing pinion 118, this cause first housing 102 to rotate away from second housing 104 to an open laptop configuration illustrated in FIGS. 4A-4C.

Figure 5A:
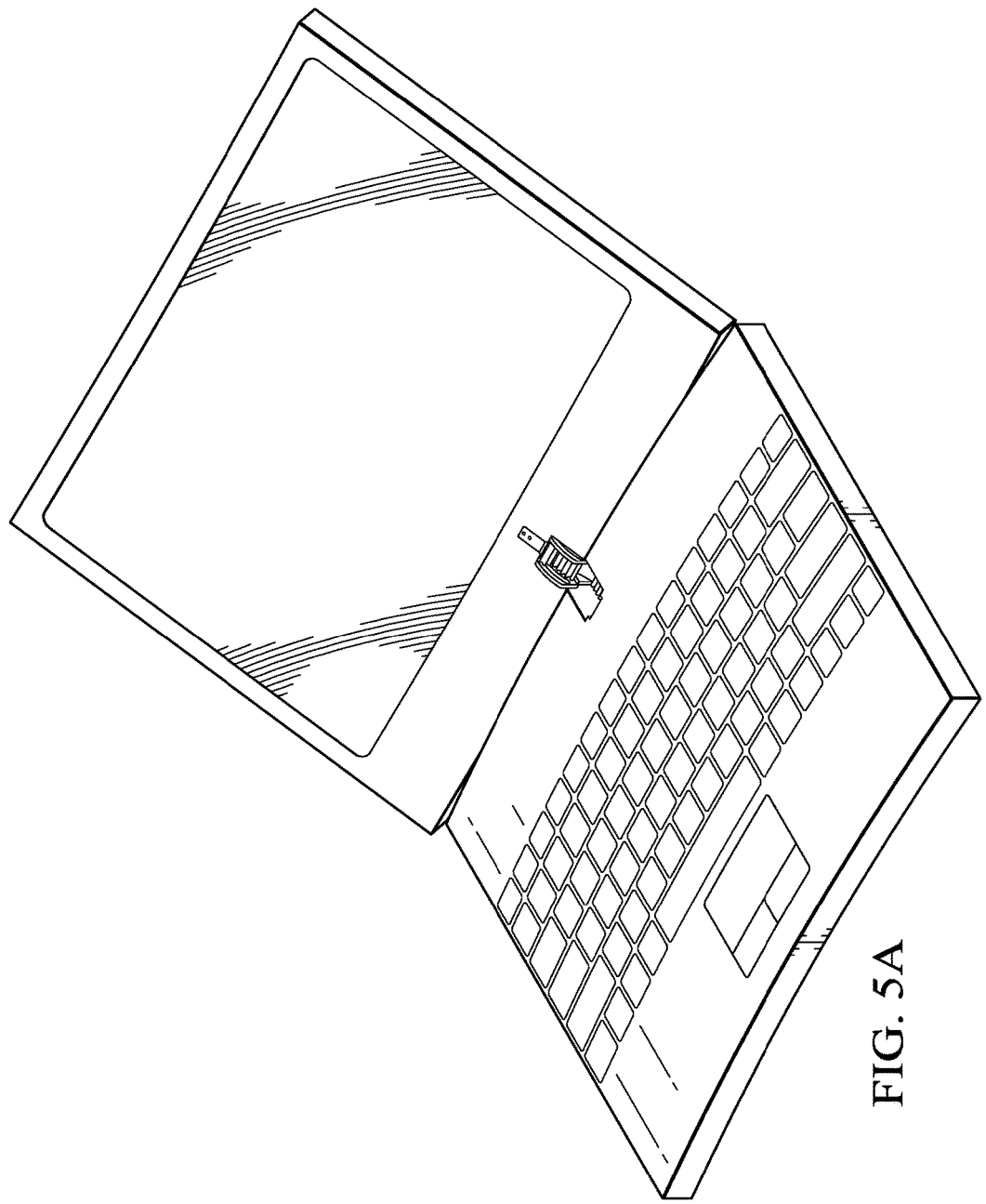
FIG. 5A is a simplified orthographic view illustrating an embodiment of an electronic device in an open clamshell configuration, in accordance with one embodiment of the present disclosure.

Turning to FIG. 5A, FIG. 5A is a simplified orthographic view of electronic device 100 in a transitioning configuration, in accordance with an embodiment of the present disclosure. As illustrated in FIG. 5A, first housing 102 has been rotated away from second housing 104 using hinge 106. If first housing 102 includes a curved display, because first housing 102 was moved laterally over second housing 104 or had been slid back relative to second housing 104, the sides of the curved display have room or space to rotate.

Figure 5B:
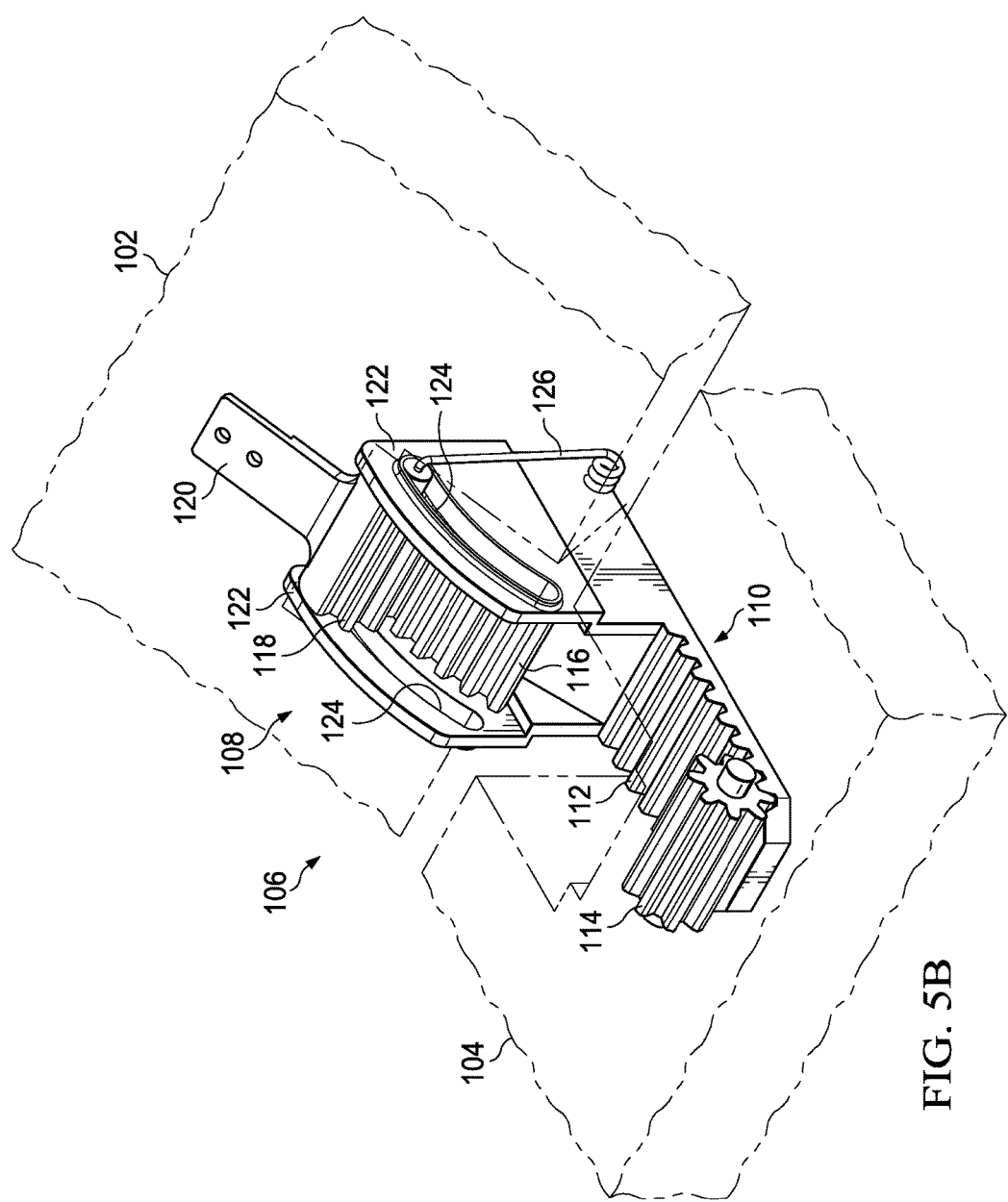
FIG. 5B is a simplified orthographic view illustrating an embodiment of a hinge, in accordance with one embodiment of the present disclosure.

Turning to FIG. 5B, FIG. 5B is a simplified orthographic view of hinge 106 in a transitioning configuration, in accordance with an embodiment of the present disclosure. As illustrated in FIG. 5B, using first housing pinion 118 and first housing securing means 120, first housing 102 has been rotated and/or rolled along first housing rack 116. Because first housing 102 is secured to first housing securing means 120 on first housing pinion 118, this cause first housing 102 to rotate away from second housing 104 to a position illustrated in FIG. 5A.

Figure 6B:
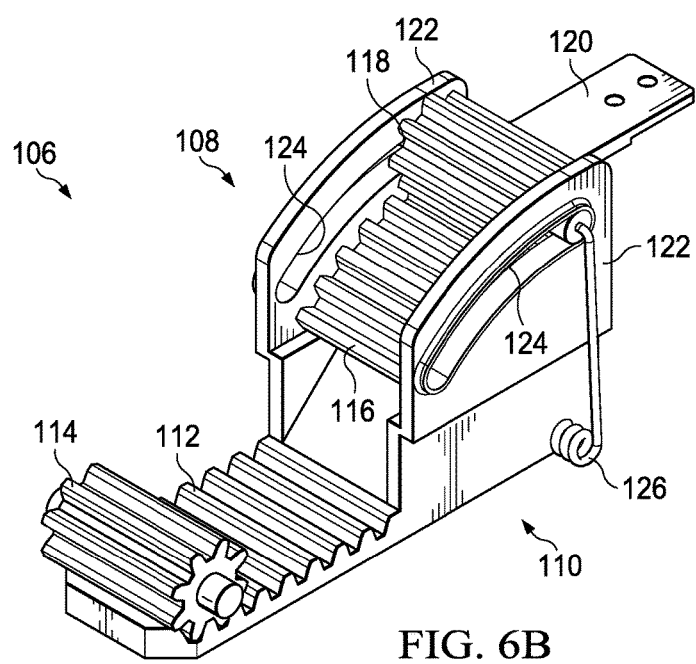
FIG. 6B is a simplified orthographic view illustrating an embodiment of a hinge, in accordance with one embodiment of the present disclosure.
Figure 6A:
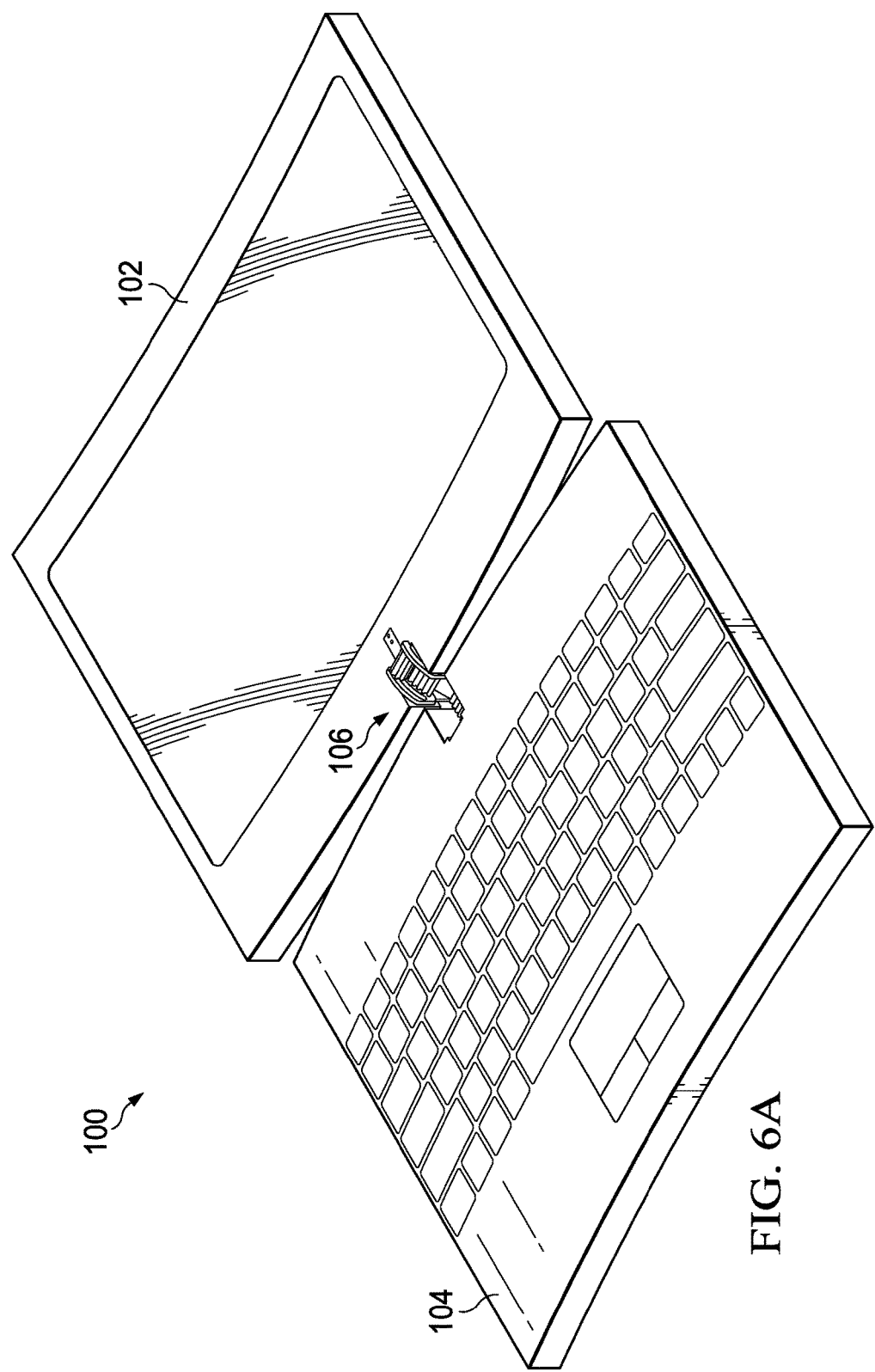
FIG. 6A is a simplified orthographic view illustrating an embodiment of an electronic device in a flat configuration, in accordance with one embodiment of the present disclosure.

Turning to FIG. 6A, FIG. 6A is a simplified orthographic view of electronic device 100 in a relatively flat configuration, in accordance with an embodiment of the present disclosure. As illustrated in FIG. 6A, first housing 102 has been rotated away from second housing 104 using hinge 106. If first housing 102 includes a curved display, because first housing 102 was moved laterally over second housing 104 or had been slid back relative to second housing 104, the bottom of the curved display has room or space to rotate.

Turning to FIG. 6B, FIG. 6B is a simplified orthographic view of hinge 106 in a relatively flat configuration, in accordance with an embodiment of the present disclosure. As illustrated in FIG. 6B, using first housing pinion 118 and first housing securing means 120, first housing 102 has been rotated and/or rolled along first housing rack 116. Because first housing 102 is secured to first housing securing means 120 on first housing pinion 118, this cause first housing 102 to rotate away from second housing 104 to a position illustrated in FIG. 6A.

Figure 7A:
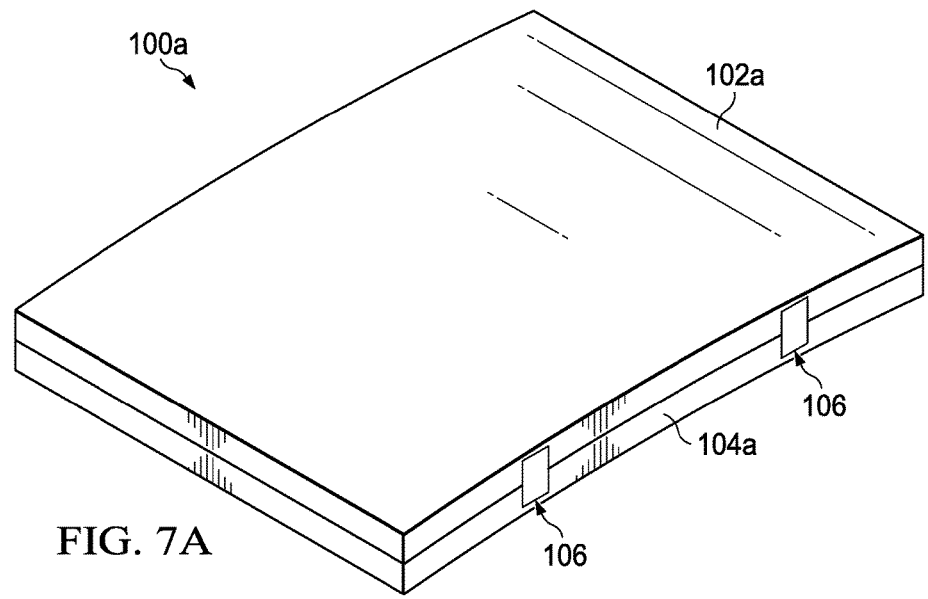
FIG. 7A is a simplified orthographic view illustrating an embodiment of an electronic device in a closed clamshell configuration, in accordance with one embodiment of the present disclosure.
Figure 7B:
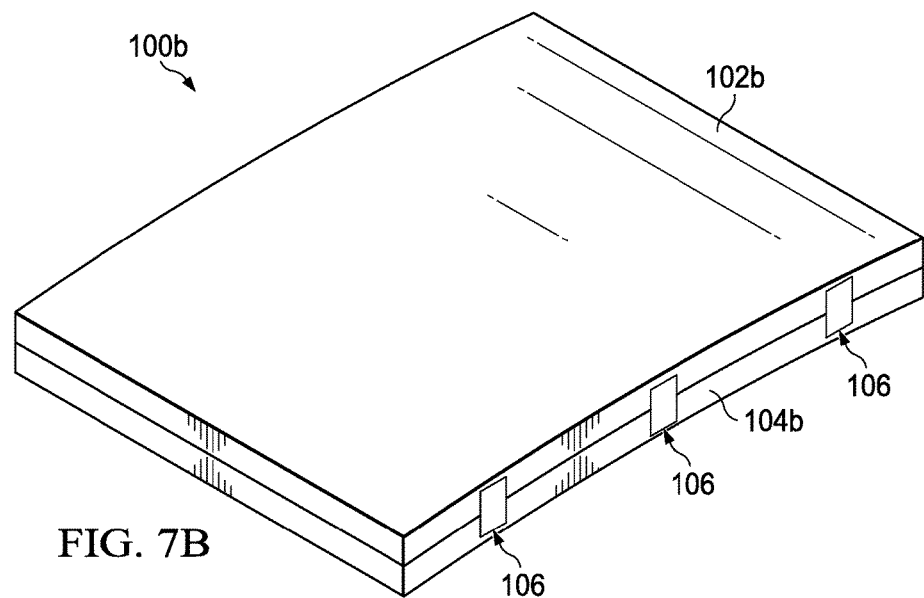
FIG. 7B is a simplified orthographic view illustrating an embodiment of an electronic device in a closed clamshell configuration, in accordance with one embodiment of the present disclosure.

Turning to FIGS. 7A and 7B, FIGS. 7A and 7B are a simplified orthographic view of different embodiments of electronic device 100. In an example, electronic device can include one or more hinges 106. For example, as illustrated in FIG. 7A, electronic device 100a includes two hinges 106. In FIG. 7B, electronic device 100b includes three hinges 106.

Figure 8A:
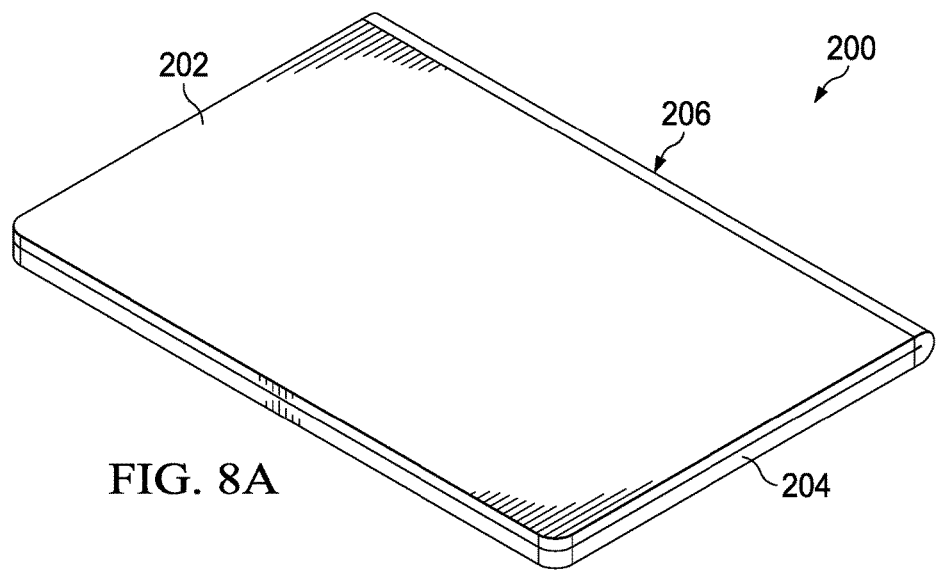
FIG. 8A is a simplified orthographic view illustrating an embodiment of an electronic device in a closed clamshell configuration, in accordance with one embodiment of the present disclosure.

Turning to FIG. 8A, FIG. 8A is a simplified orthographic view illustrating an embodiment of an electronic device 200 is a closed clamshell configuration, in accordance with one embodiment of the present disclosure. Electronic device 200 can include a first housing 202, a second housing 204, and a hinge 206. Hinge 206 can define an axis of rotation that is shared between first housing 202 and second housing 204. In an example, hinge 106 may be comprised of a shape memory polymer. The shape memory polymer can transition between a relatively flexible state and a relatively rigid state. The transition to the relatively flexible state may be triggered by touch of a specific area on electronic device 200 or some other means of activation.

The term "shape memory polymer" includes polymeric materials that have the ability to transition from an original rigid or semi-rigid permanent shape to a deformed state that is a semi-rigid or flexible temporary shape when induced by an external stimulus or trigger (e.g., a temperature change, electric or magnetic field, light, solution, etc.). The shape memory polymers are polymers whose qualities have been altered to give them dynamic shape memory properties. Upon activation of the external stimulus or trigger, the shape memory polymer can change from a rigid or semi-rigid state to an elastic or semi-rigid state, then back to a rigid or semi-rigid state again when the external stimulus or trigger is removed. In its elastic or semi-rigid state, the shape memory polymer can be stretched, folded, or otherwise conformed to other shapes without degradation of the material.

In an example, hinge 206 may be a low-profile hinge that can accommodate about 360° of rotation and has a low z-height. The term low-profile hinge includes a hinge with a low, flat, or relatively flat profile with a low total z-height. In one or more embodiments, electronic device 200 is a notebook computer or laptop computer. In still other embodiments, electronic device 200 may be any suitable electronic device having a hinge (e.g., hinge 206) such as a mobile device, an audio system, a movie player, etc. In yet another embodiment, hinge 206 may be located in a non-electrical device that allows for the functions of hinge 206 as described herein or is apparent to one skilled in the art A hybrid laptop, is a one-piece mobile computer that can include a laptop configuration and a tablet configuration. To convert from the laptop configuration to the tablet configuration, often the display or screen can rotate around a keyboard. While hybrid laptops are a compelling way of delivering convertibility from a laptop configuration to a tablet configuration, in some designs, the hinge can be bulky and limit the form-factor of the device. For example, the z-height (height on the z axis of an X, Y, Z, Cartesian coordinate system) of the hybrid laptop is often dependent on the hinge design.

Currently, form-factor limitations for electronic devices such as hybrid laptops are addressed by enabling ultra-low-profile and small form-factor components (e.g., coreless package and motherboard, connectors, batteries, etc.). The development of high density super-capacitors is also being used to further reduce the battery form-factor and density to enable low-profile platforms. However, the form factor for a low-profile device is often limited by the hinge.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In the examples of the present specification, a system and method is provided for a low-profile hinge design. In one example, using a memory shaped polymer design, a device can be configured with a hinge such that the hinge form-factor does not limit the scaling of the total z-height of the device. The hinge can be a low-profile three hundred and sixty degree (360°) hinge. The total thickness of the hinge design can be scaled according to a desired z-height through configuring the dimension of the memory shaped polymer of the hinge. Hence, the overall z-height of the device can be scaled based on the components of the device (e.g., first housing 102 and second housing 104) and not be limited by the hinge size. For example, using the low-profile hinge design an electronic device can operate in a low-profile clamshell configuration, a low-profile flat configuration, and a low-profile tablet configuration.

The following is an illustration of an example of a hinge design according to one or more example embodiments of the present specification. It should be noted that the hinge designs disclosed here are given as non-limiting examples only, and it is intended that any suitable technique or configuration should be included in the broad scope of this specification.

The following detailed description sets forth example embodiments of apparatuses, methods, and systems relating to low-profile hinge configurations for an electronic device. Features such as structure(s), function(s), and/or characteristic(s), for example, are described with reference to one embodiment as a matter of convenience; various embodiments may be implemented with any suitable one or more of the described features.

Figure 8D:
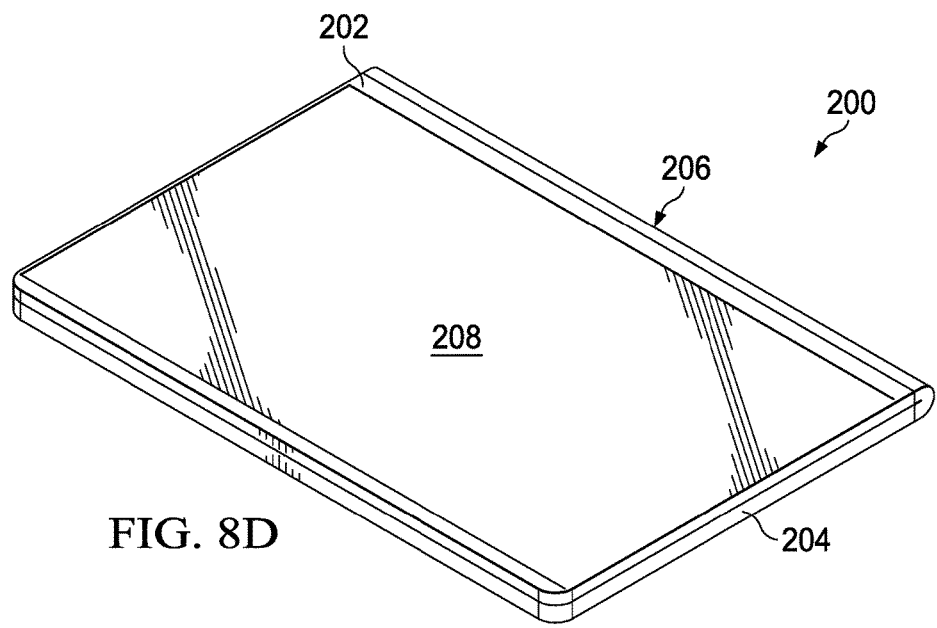
FIG. 8D is a simplified orthographic view illustrating an embodiment of an electronic device in a tablet configuration, in accordance with one embodiment of the present disclosure.
Figure 8B:
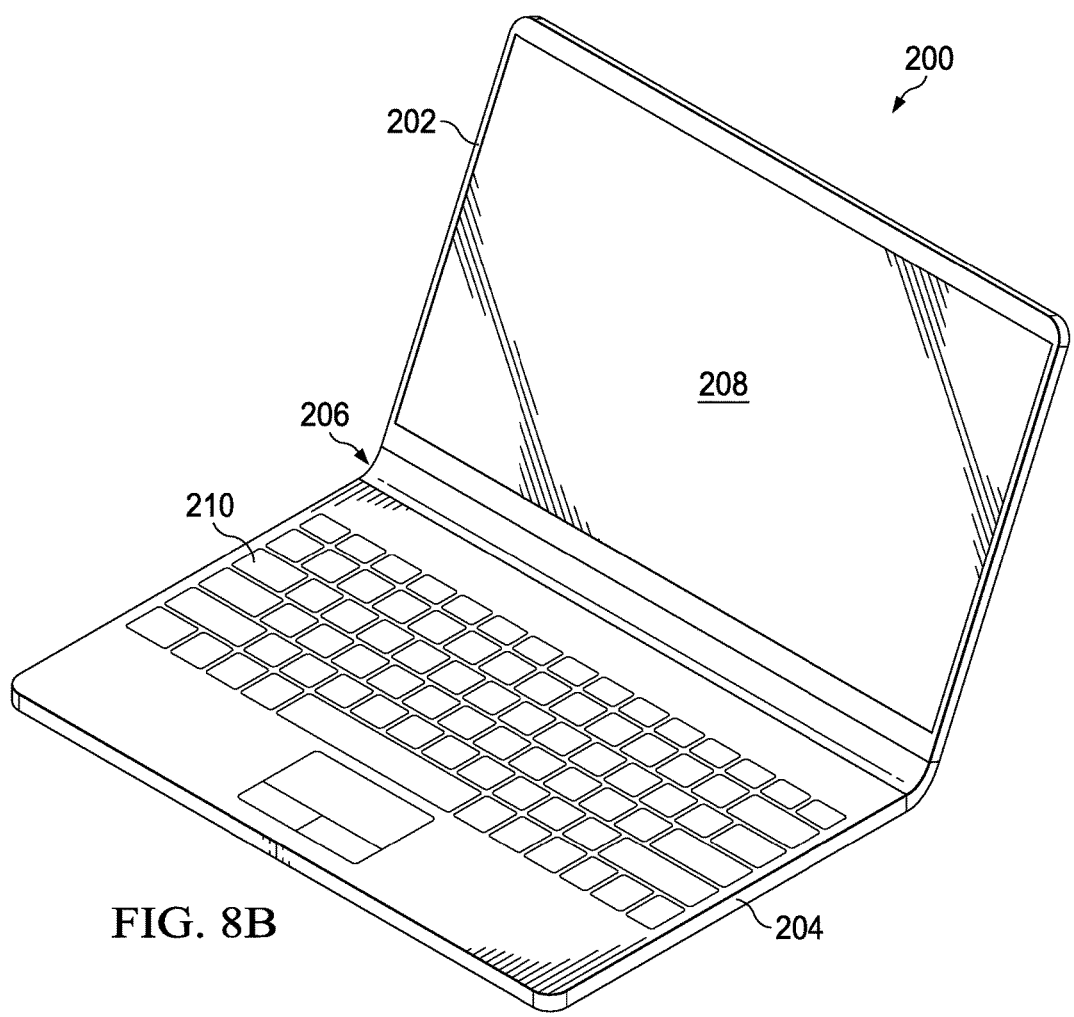
FIG. 8B is a simplified orthographic view illustrating an embodiment of an electronic device in an open clamshell configuration, in accordance with one embodiment of the present disclosure.

Turning to FIG. 8B, FIG. 8B is a simplified orthographic view of electronic device 200 in an open clamshell configuration in accordance with one embodiment of the present disclosure. First housing 202 can include a display 208. In one or more embodiments, display 208 can be a liquid crystal display (LCD) display screen, a light-emitting diode (LED) display screen, an organic light-emitting diode (OLED) display screen, a plasma display screen, or any other suitable display screen system. Display 208 may be a touchscreen that can detect the presence and location of a touch within the display area. In another embodiment, first housing 202 may include a camera, a microphone, and speakers.

In one or more embodiments, second housing 204 can include a keyboard 210 and/or can function as an input device. Second housing 204 may include a mechanical keyboard, touch screen, input area, etc. The touch screen can detect the presence and location of a touch within the touch screen area. In one example, the touch screen can be configured to allow for the input of letters, numbers, characters, functions, etc. similar to a mechanical keyboard and the touch screen may be used in place of (or instead of) a mechanical keyboard. In another example, the touch screen may supplement a mechanical keyboard and may be configured to operate as a number key pad, design area, function call, or some other similar input area.

Turning to FIG. 8C, FIG. 8C is a simplified orthographic view of electronic device 200 in an open, flat configuration in accordance with one embodiment of the present disclosure. As illustrated, in FIG. 8C, first housing 202 has been rotated on hinge 206 such that first housing 202 is in the same plane or about the same plane as second housing 204. In this configuration, hinge 206 can have a low, flat or relatively flat profile with a low total z-height.

Turning to FIG. 8D, FIG. 8D is a simplified orthographic view of an electronic device in a tablet configuration in accordance with one embodiment of the present disclosure. As illustrated in FIG. 8D, first housing 202 has been rotated around second housing 204 such that display 208 faces away from keyboard 210. Hinge 206 can be configured to be flexible while activated and allow first housing 202 to be rotated about 360° around second housing 204. When hinge 206 is deactivated, hinge can provide a relatively ridged hinge to allow first housing 202 to remain in a configuration desired by a user.

In an example, hinge 206 can include connectors and mechanical retentions to provide an electrical connection between first housing 202 and second housing 204. In one embodiment, the electrical connections between a motherboard in second housing 204 and display components in first housing 202 are formed through conventional wire-connections through hinge 206. In another embodiment, a printed circuit board (PCB) interconnector is used to electrically connect first housing 202 and second housing 204. In other examples, electrical current and signals can be passed through a plug-in connector (e.g., whose male side protrusion connects to first housing 202 and whose female side connects to second housing 204 (or vice-versa) or a wireless connector (e.g., Wi-Fi, Bluetooth, etc.). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 200. [Thunderbolt™ and the Thunderbolt logo are trademarks of Intel Corporation in the U.S. and/or other countries.]. Virtually any other electrical connection methods could be used and, thus, are clearly within the scope of the present disclosure.

In an embodiment, the majority of the system components (e.g., motherboard, hard drive, battery, communication modules, etc.) remain in second housing 104. First housing 102 may also contain a camera module, microphone, speakers, and/or a wireless module. Such a design allows for the electronic device to function in a clamshell configuration or a tablet configuration. In an embodiment, the display includes a plurality of electrical components that allow first housing 102 to function or operate as a tablet.

Figure 9A:
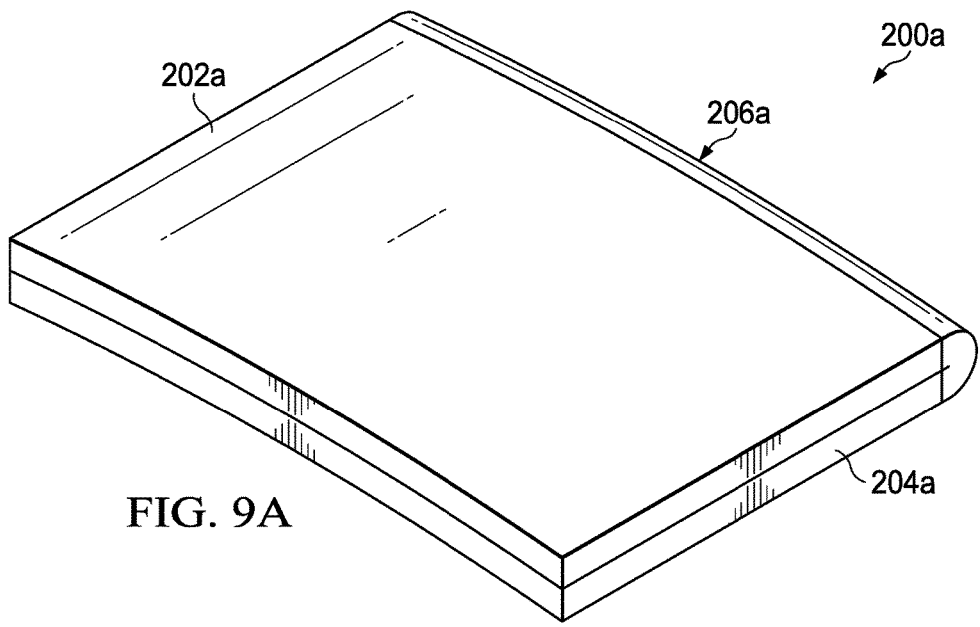
FIG. 9A is a simplified orthographic view illustrating an embodiment of an electronic device in a closed clamshell configuration, in accordance with one embodiment of the present disclosure.

Turning to FIG. 9A, FIG. 9A is a simplified orthographic view illustrating an embodiment of an electronic device 200a in a closed clamshell configuration, in accordance with one embodiment of the present disclosure. Electronic device 200a can include a first housing 202a, a second housing 204a, and a hinge 206a. Hinge 206a can define an axis of rotation that is shared between first housing 202a and second housing 204a. In an example, first housing 202a may be a curved display. In addition, second housing 204a may be curved and/or have a profile that matches or mirrors the profile of first housing 202a.

Figure 9D:
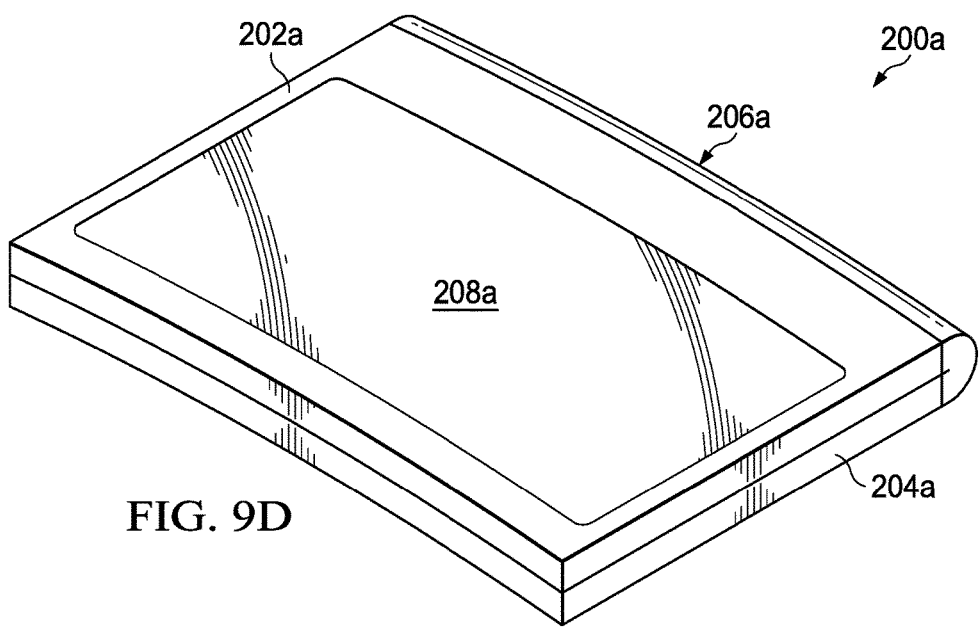
FIG. 9D is a simplified orthographic view illustrating an embodiment of an electronic device in a tablet configuration, in accordance with one embodiment of the present disclosure.
Figure 9B:
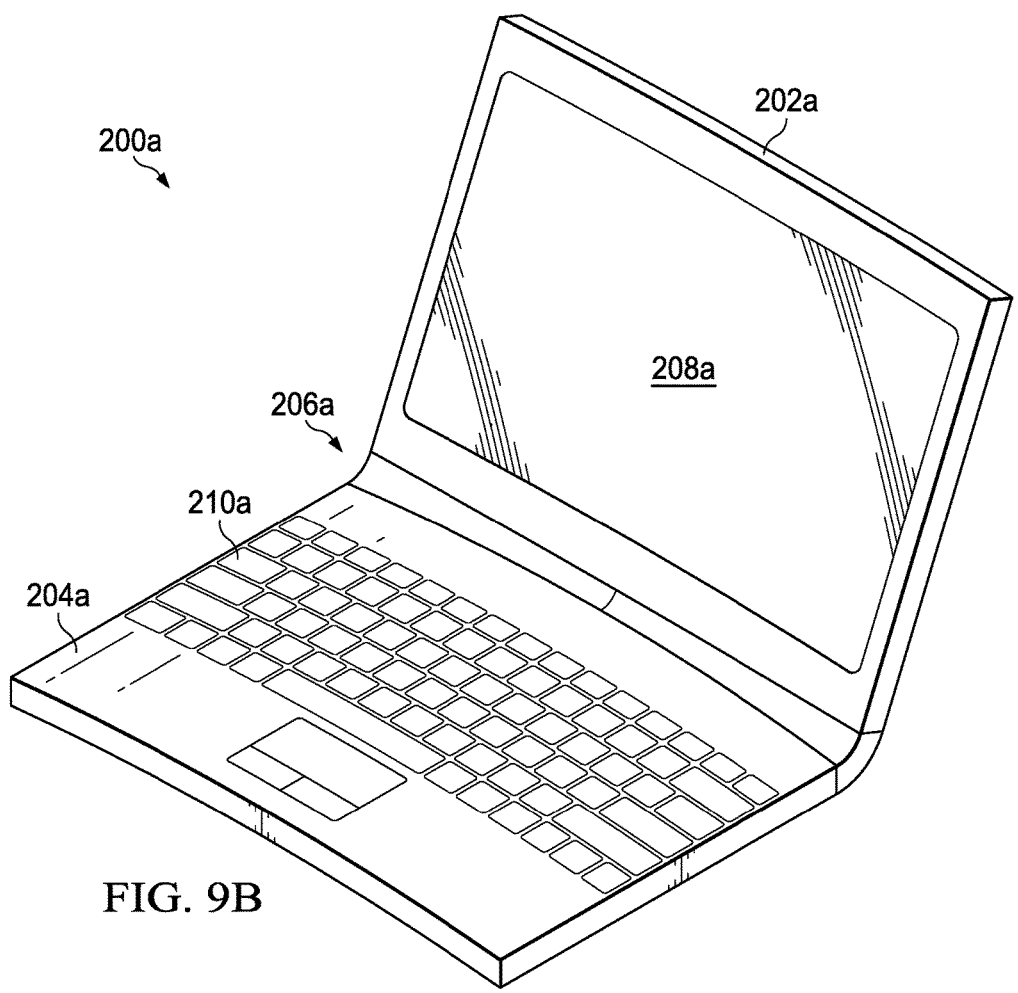
FIG. 9B is a simplified orthographic view illustrating an embodiment of an electronic device in an open clamshell configuration, in accordance with one embodiment of the present disclosure.

Turning to FIG. 9B, FIG. 9B is a simplified orthographic view of electronic device 200a in an open clamshell configuration in accordance with one embodiment of the present disclosure. First housing 202a can include a display 208a. In one or more embodiments, display 208a can be a curved LCD display screen, LED display screen, OLED display screen, plasma display screen, or any other suitable curved display screen system. Display 208a may be a curved touchscreen that can detect the presence and location of a touch within the display area. Hinge 206a can accommodate the curvature of display 208a. First housing 202a may include a camera, a microphone, and speakers.

In one or more embodiments, second housing 204a can include a keyboard 210a and/or can function as an input device. Second housing 204a may include a mechanical keyboard, touch screen, input area, etc. The touch screen can detect the presence and location of a touch within the touch screen area. In one example, the touch screen can be configured to allow for the input of letters, numbers, characters, functions, etc. similar to a mechanical keyboard and the touch screen may be used in place of (or instead of) a mechanical keyboard. In another example, the touch screen may supplement a mechanical keyboard and may be configured to operate as a number key pad, design area, function call, or some other similar input area.

Turning to FIG. 9C, FIG. 9C is a simplified orthographic view of electronic device 200a in an open, flat configuration in accordance with one embodiment of the present disclosure. As illustrated, in FIG. 9C, first housing 202a has been rotated on hinge 206a such that first housing 202a is in the same plane or about the same plane as second housing 204a. In this configuration, hinge 206a can accommodate the curvature of display 208a if display 208a is a curved display.

Turning to FIG. 9D, FIG. 9D is a simplified orthographic view of an electronic device in a tablet configuration in accordance with one embodiment of the present disclosure. As illustrated in FIG. 9D, first housing 202a has been rotated relative to second housing 204a such that display 208a faces away from keyboard 210a. Hinge 206a can be configured to be flexible while activated and allow first housing 202a to be rotated about 360° around second housing 204a and can accommodate the curvature of display 208a if display 208a is a curved display. When hinge 206a is deactivated, hinge 206a can become rigid, semi-rigid, relatively ridged, etc. to allow first housing 202a to remain in a configuration desired by a user.

Figure 10A:
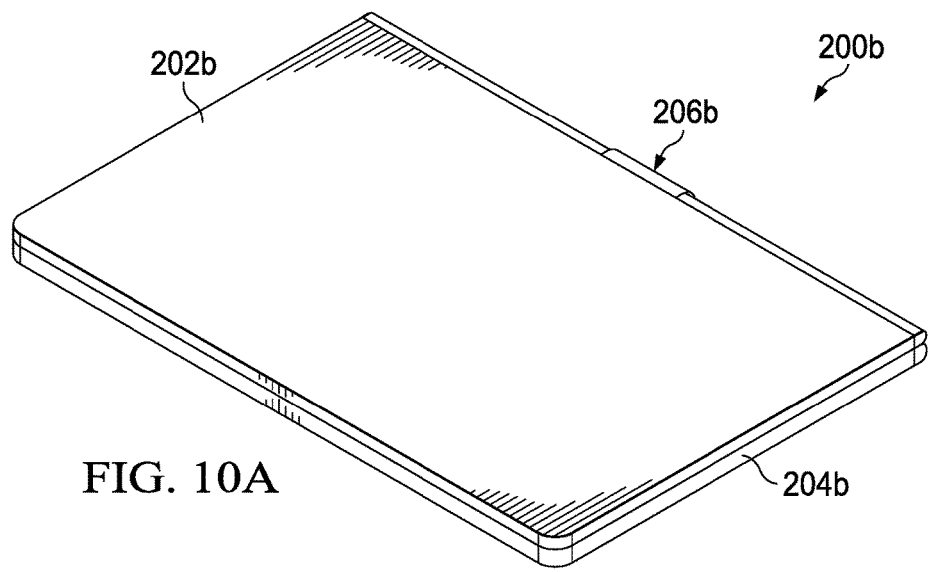
FIG. 10A is a simplified orthographic view illustrating an embodiment of an electronic device in a closed clamshell configuration, in accordance with one embodiment of the present disclosure.
Figure 10B:
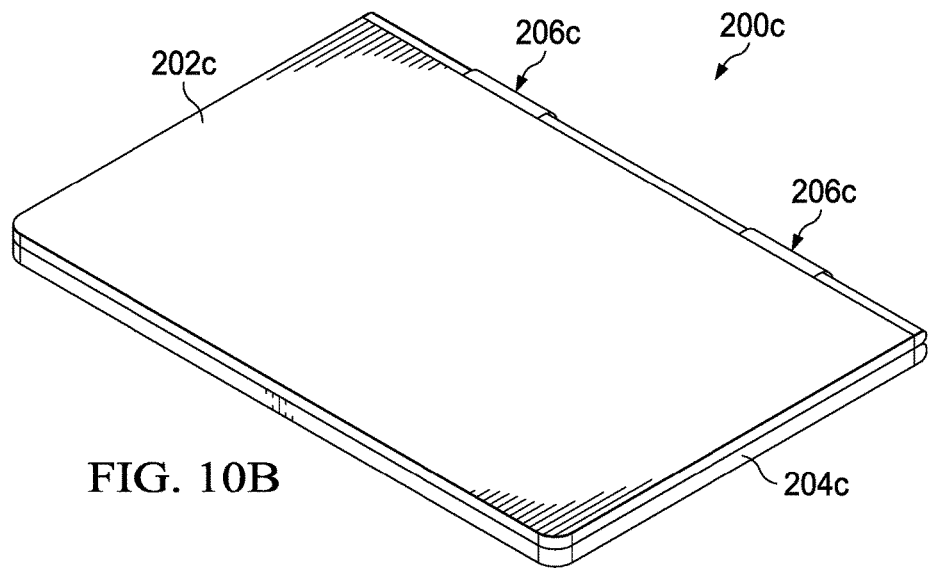
FIG. 10B is a simplified orthographic view illustrating an embodiment of an electronic device in a closed clamshell configuration, in accordance with one embodiment of the present disclosure.
Figure 10C:
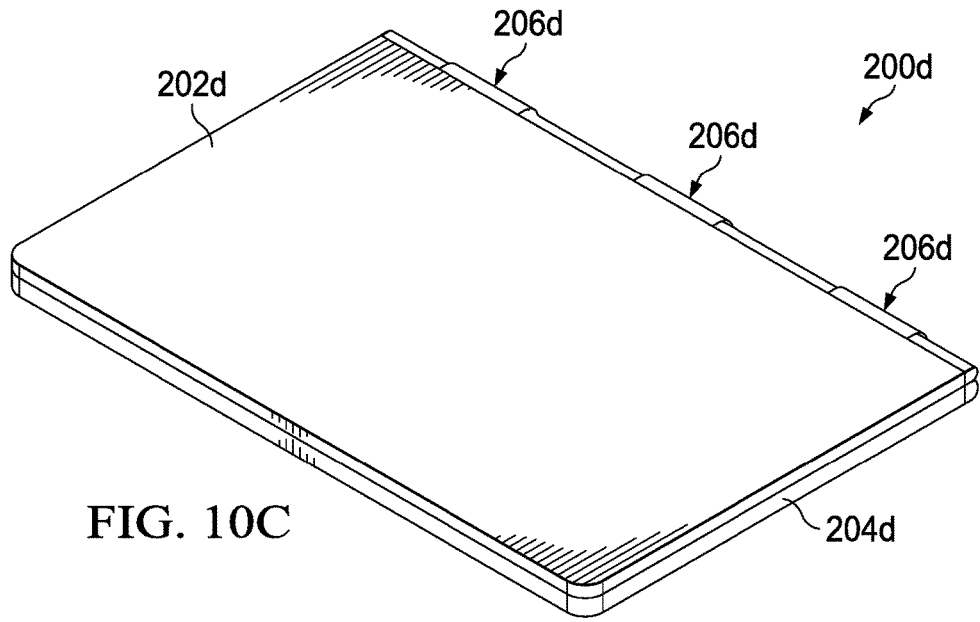
FIG. 10C is a simplified orthographic view illustrating an embodiment of an electronic device in a closed clamshell configuration, in accordance with one embodiment of the present disclosure.

Turning to FIGS. 10A-10C, FIGS. 10A-10C are a simplified bock diagram view of different embodiments of electronic device 200. In an example, electronic device 200 can include one or more hinges 106. For example, as illustrated in FIG. 10A, electronic device 200b includes one hinge 206b located near a middle portion of first housing 202b and second housing 204b. In FIG. 10B, electronic device 200c includes two hinges 206c that rotatably couple first housing 202c to second housing 204c. In FIG. 10C, electronic device 200d includes three hinges 206d that rotatably couple first housing 202d to second housing 204d. It should be readily apparent to those with skill in the art that more hinges 206 can be used than those illustrated in FIG. 10C and the number and location of the hinges can depend on design choice.

Figure 11A:
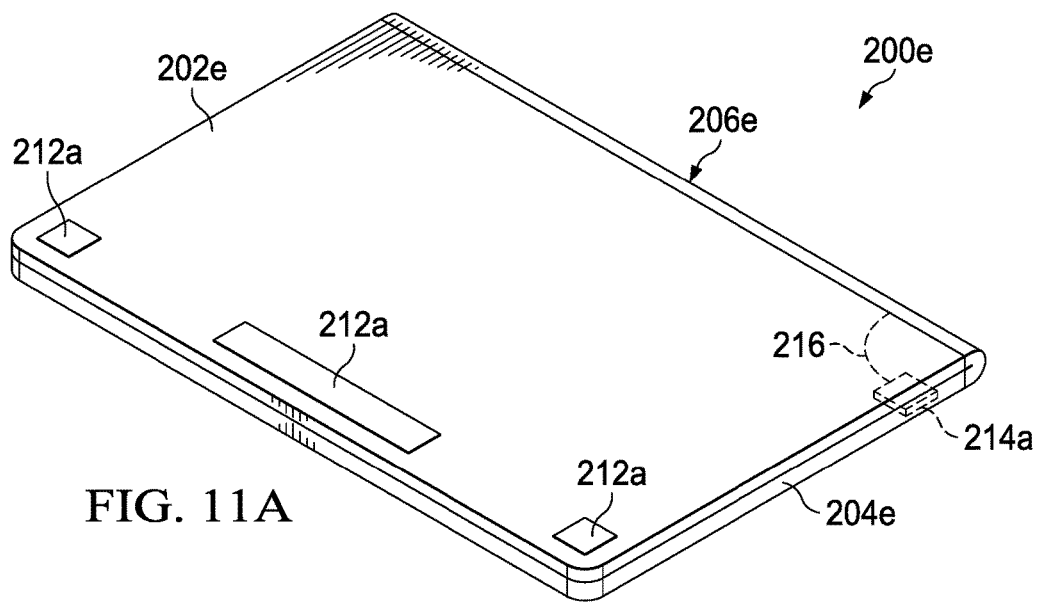
FIG. 11A is a simplified orthographic view illustrating an embodiment of an electronic device in a closed clamshell configuration, in accordance with one embodiment of the present disclosure.

Turning to FIG. 11A, FIG. 11A is a simplified orthographic view of an electronic device 200e in accordance with one embodiment of the present disclosure. As illustrated in FIG. 11A, first housing 202e can include one or more activation areas 212a. Second housing 204e can include activation engine 214a. Activation engine 214a can be coupled to hinge 206e using communication path 216. When an activation area 212a is activate (e.g., a touch by a user), a signal can be sent to activation engine 214a to activate hinge 206e. Activation engine 214a can use communication path 216 to activate hinge 206e. For example, if hinge 206e is activated by heat or an electrical signal, when a user touches one or more activation areas 212a, activation engine 214a can communicate heat energy or an electrical signal to hinge 206e and activate hinge 206e. When hinge 206e is activated, the user can rotate first housing 202e relative to second housing 204e and position first housing 202e to a desired position. Once first housing 202e is positioned at the desired position, the user can stop touching one or more activation areas 212a. This causes activation engine 214a to deactivate hinge 206e or stop communicating heat energy or an electrical signal to hinge 206e. As a result, hinge 206e will become rigid, semi-rigid, somewhat rigid, etc. and remain at the position set by the user. In an example, a user must touch two or more activation areas 212a at the same time in order to activate hinge 206e and avoid accidental activation of hinge 206e.

Figure 11B:
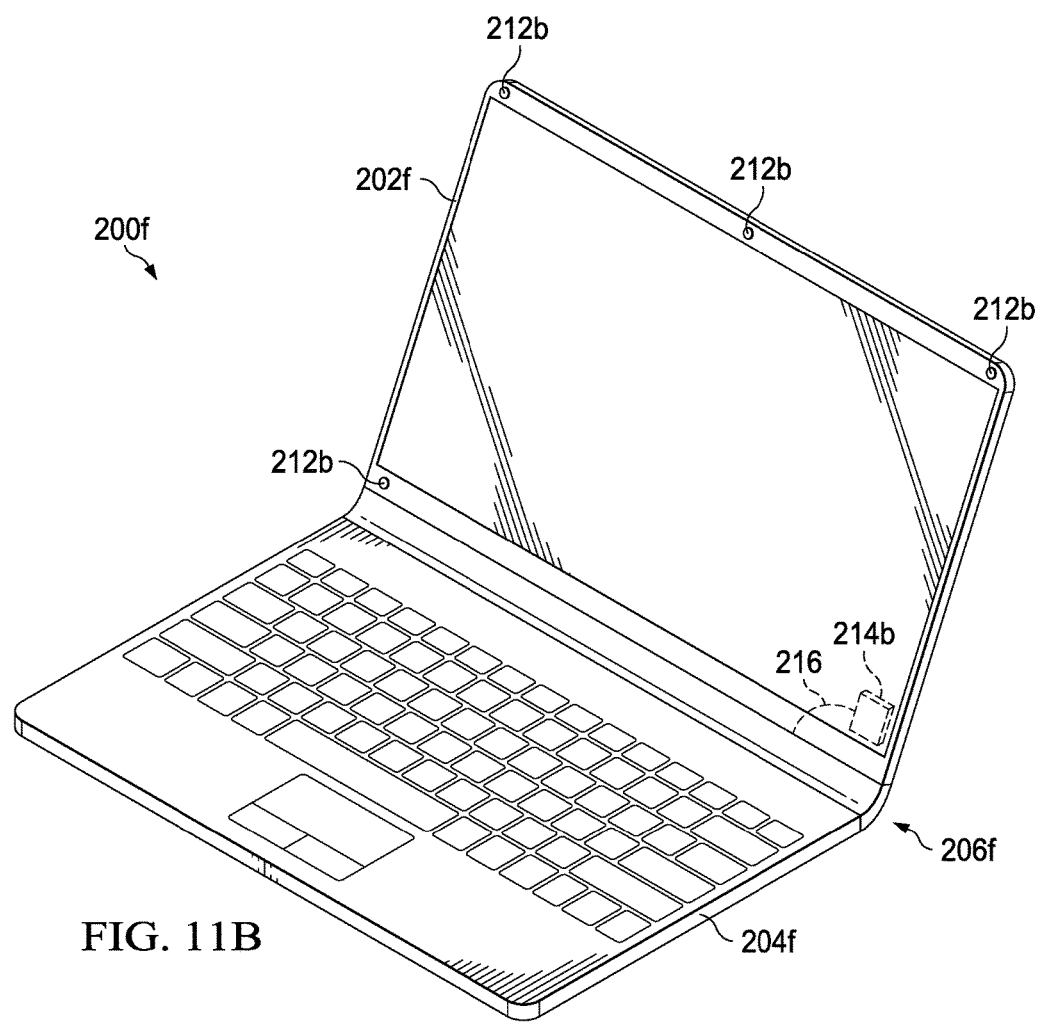
FIG. 11B is a simplified orthographic view illustrating an embodiment of an electronic device in an open clamshell configuration, in accordance with one embodiment of the present disclosure.

Turning to FIG. 11B, FIG. 11B is a simplified orthographic view of an electronic device 200f in accordance with one embodiment of the present disclosure. As illustrated in FIG. 11B, first housing 202f can include one or more activation areas 212b and an activation engine 214b. Activation engine 214b can be coupled to hinge 206f using communication path 216. When an activation area 212b is activate (e.g., a touch by a user), a signal can be sent to activation engine 214b to activate hinge 206b. Activation engine 214b can use communication path 216 to activate hinge 206f. For example, if hinge 206f is activated by heat or an electrical signal, when a user touches one or more activation areas 212b, activation engine 214b can communicate heat energy or an electrical signal to hinge 206f and activate hinge 206f. When hinge 206f is activated, the user can rotate first housing 202f relative to second housing 204f and position first housing 202f to a desired position. Once first housing 202f is positioned at the desired position, the user can stop touching one or more activation areas 212b. This causes activation engine 214b to deactivate hinge 206f or stop communicating heat energy or an electrical signal to hinge 206f. As a result, hinge 206f will become somewhat rigid and remain at the position set by the user. In an example, a user must touch two or more activation areas 212f at the same time in order to activate hinge 206f and avoid accidental activation of hinge 206f.

Figure 11C:
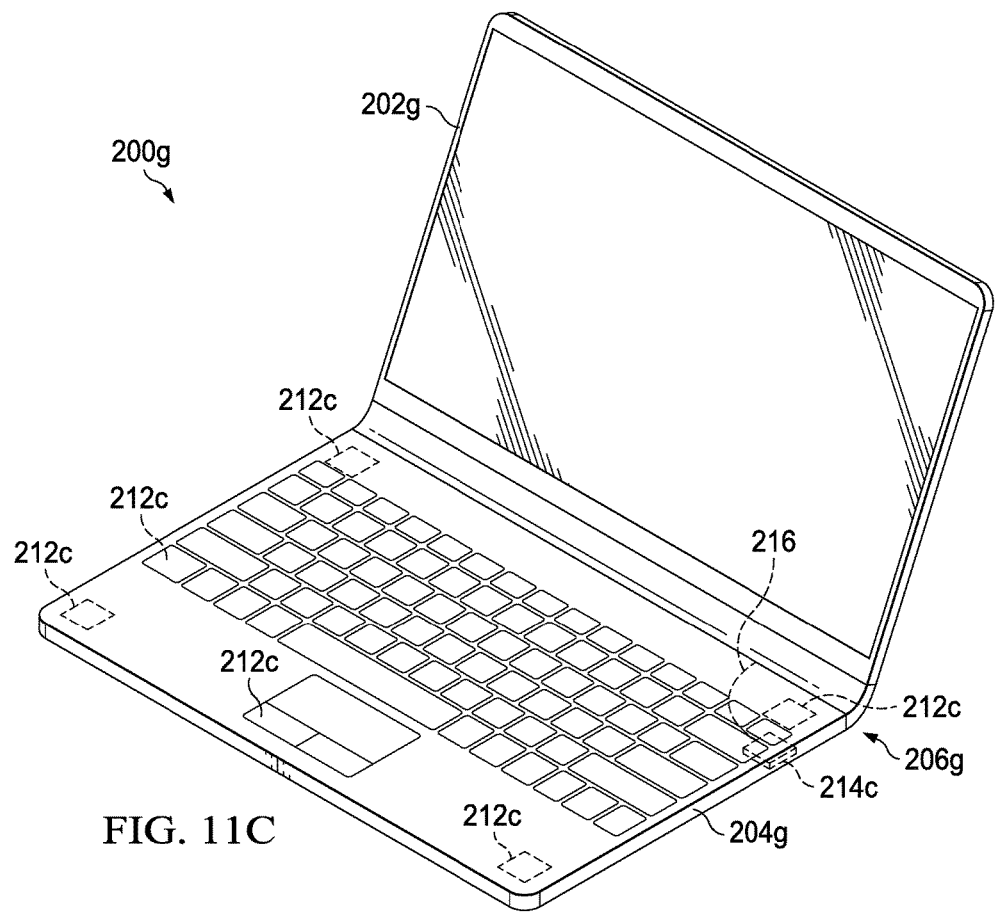
FIG. 11C is a simplified orthographic view illustrating an embodiment of an electronic device in an open clamshell configuration, in accordance with one embodiment of the present disclosure.

Turning to FIG. 11C, FIG. 11C is a simplified orthographic view of an electronic device 200g in accordance with one embodiment of the present disclosure. As illustrated in FIG. 11C, second housing 204g can include one or more activation areas 212c and activation engine 214c. Activation engine 214c can be coupled to hinge 206g using communication path 216. When an activation area 212c is activate (e.g., a touch by a user), a signal can be sent to activation engine 214c to activate hinge 206g. Activation engine 214c can use communication path 216 to activate hinge 206g. For example, if hinge 206g is activated by heat or an electrical signal, when a user touches one or more activation areas 212c, activation engine 214c can communicate heat energy or an electrical signal to hinge 206g and activate hinge 206g. When hinge 206g is activated, the user can rotate first housing 202g relative to second housing 204g and position first housing 202g to a desired position. Once first housing 202g is positioned at the desired position, the user can stop touching one or more activation areas 212c. This causes activation engine 214c to deactivate hinge 206g or stop communicating heat energy or an electrical signal to hinge 206g. As a result, hinge 206g will become somewhat rigid and remain at the position set by the user. In an example, a user must touch two or more activation areas 212c at the same time in order to activate hinge 206g and avoid accidental activation of hinge 206g.

Figure 11D:
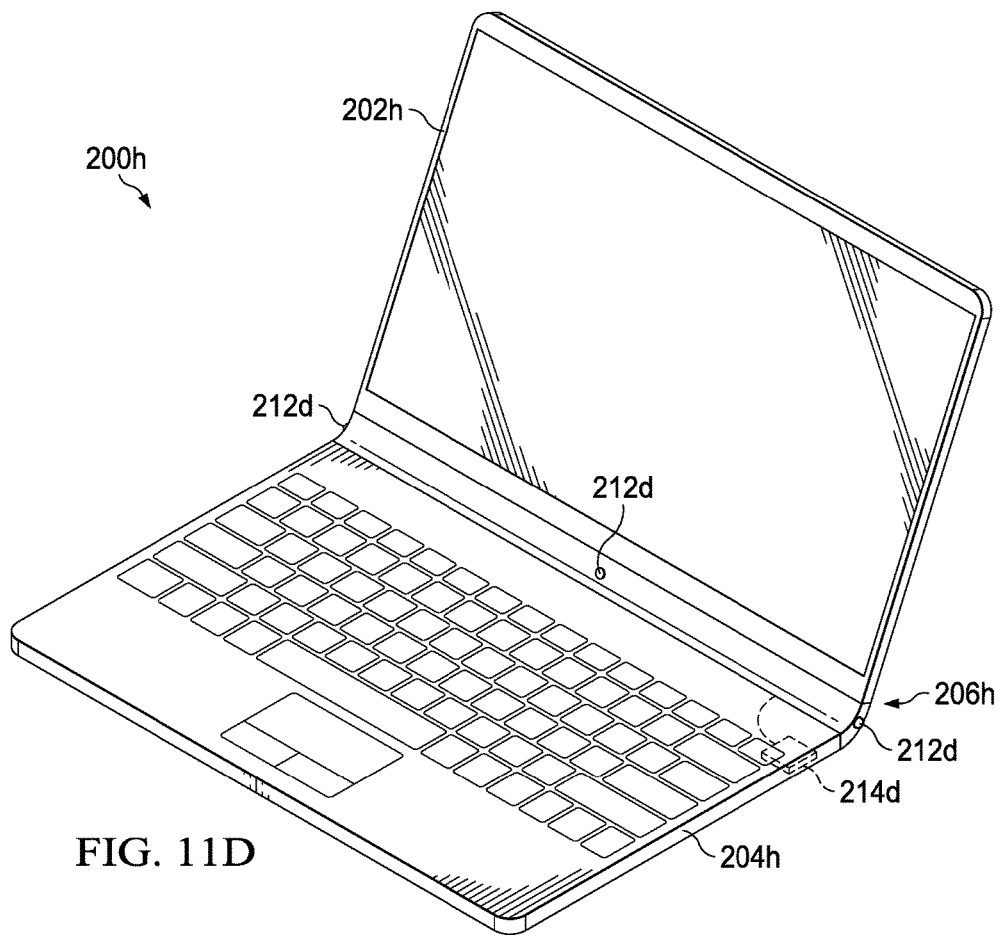
FIG. 11D is a simplified orthographic view illustrating an embodiment of an electronic device in an open clamshell configuration, in accordance with one embodiment of the present disclosure.

Turning to FIG. 11D, FIG. 11D is a simplified orthographic view of an electronic device 200h in accordance with one embodiment of the present disclosure. As illustrated in FIG. 11D, hinge 206h can include one or more activation areas 212d and second housing 204h can include an activation engine 214d. Activation engine 214d can be coupled to hinge 206h using communication path 216. When an activation area 212d is activate (e.g., a touch by a user), a signal can be sent to activation engine 214*d* to activate hinge 206*h*. Activation engine 214*d* can use communication path 216 to activate hinge 206*h*. For example, if hinge 206*h* is activated by heat or an electrical signal, when a user touches one or more activation areas 212*d*, activation engine 214*d* can communicate heat energy or an electrical signal to hinge 206*h* and activate hinge 206*h*. When hinge 206*h* is activated, the user can rotate first housing 202*h* relative to second housing 204*h* and position first housing 202*h* to a desired position. Once first housing 202*h* is positioned at the desired position, the user can stop touching one or more activation areas 212*d*. This causes activation engine 214*d* to deactivate hinge 206*h* or stop communicating heat energy or an electrical signal to hinge 206*h*. As a result, hinge 206*h* will become somewhat rigid and remain at the position set by the user. In an example, a user must touch two or more activation areas 212*d* at the same time in order to activate hinge 206*h* and avoid accidental activation of hinge 206*h*.

Figure 12:
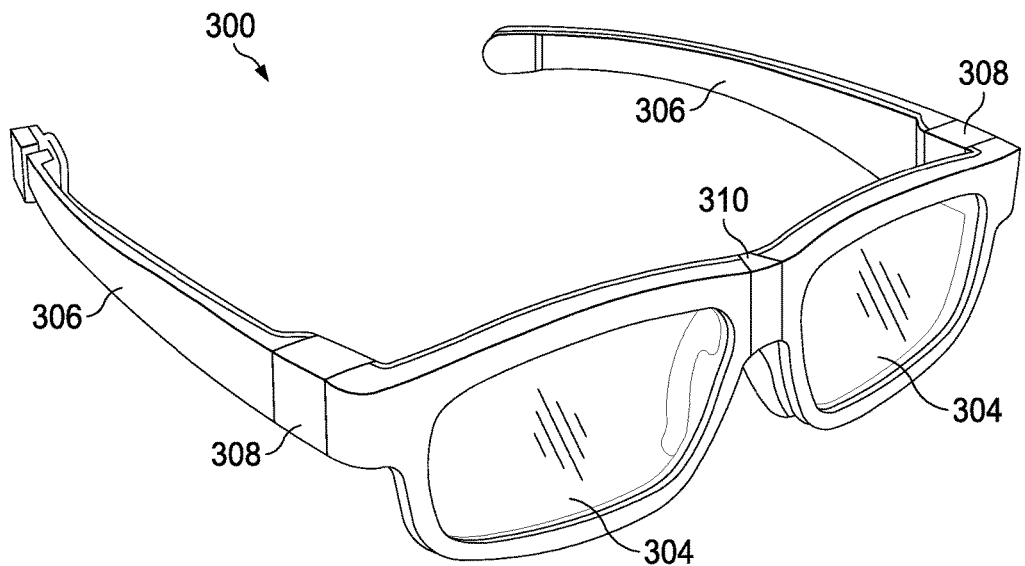
FIG. 12 is a simplified orthographic view illustrating an embodiment of a wearable, in accordance with one embodiment of the present disclosure.

Turning to FIG. 12, FIG. 12 is a simplified orthographic view of an electronic device 300 in accordance with one embodiment of the present disclosure. As illustrated in FIG. 12, electronic device 300 may be a wearable such as eyewear. Electronic device 300 can include lenses 304, earpieces 306, earpiece hinge 308, and lenses hinge 310. In an example, earpiece hinge 308 and/or lenses hinge 310 may be at least partially comprised of a shape memory polymer. The shape memory polymer may be activated by heat from a user's body such that electronic device 300 can conform to the user.

Figure 13A:
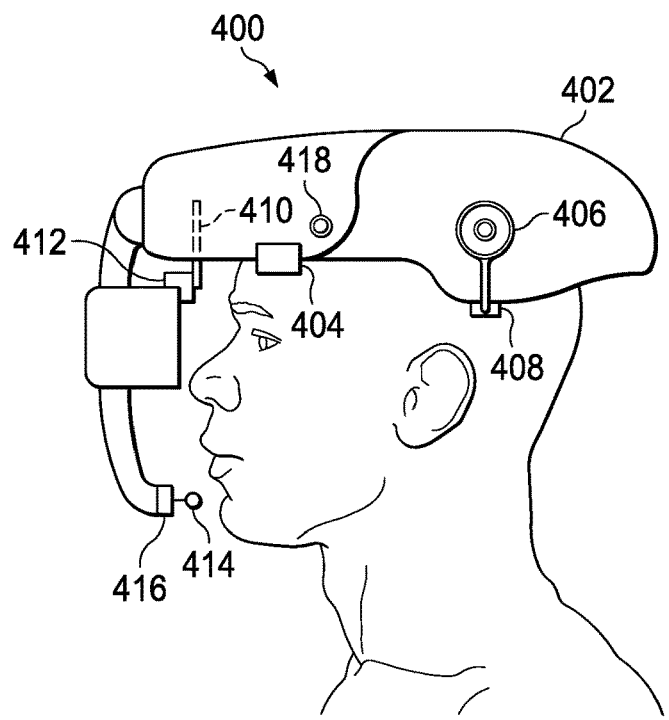
FIG. 13A is a simplified orthographic view illustrating an embodiment of a wearable, in accordance with one embodiment of the present disclosure.
Figure 13B:
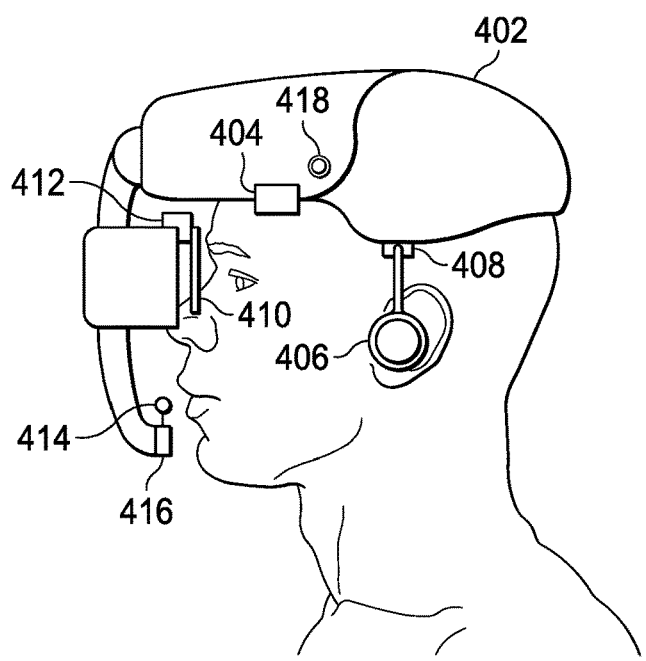
FIG. 13B is a simplified orthographic view illustrating an embodiment of a wearable, in accordance with one embodiment of the present disclosure.

Turning to FIGS. 13A and 13B, FIGS. 13A and 13B are a simplified block diagram view of an electronic device 400 in accordance with one embodiment of the present disclosure. As illustrated in FIG. 13A, electronic device 400 may be a wearable such as a helmet or headgear. Electronic device 400 can include a head piece 402, a head piece hinge 404, a speaker 406, a speaker hinge 408, a screen or display 410, a screen or display hinge 412, a microphone 414, a microphone hinge 416, and an activation engine 418. In an example, head piece hinge 404, speaker hinge 408, screen or display hinge 412, and/or microphone hinge 416 may at least partially be comprised of a shape memory polymer. Activation engine 418 can activate the shape memory polymer in head piece hinge 404, speaker hinge 408, screen or display hinge 412, and/or microphone hinge 416.

More specifically, when a user put on electronic device 400, electronic device may have a loose fit as illustrated in FIG. 13A. Activation engine 418 may detect that the user has put on electronic device or may receive some other type of signal (e.g., electronic device 400 may include an activation area similar to activation area 212 illustrated in FIGS. 11A-11D that a user activates) that cause activation engine 418 to activate head piece hinge 404 and tighten electronic device 400 on the user as illustrated in FIG. 13B. Also, activation engine 418 can activate speaker hinge 408 and cause speaker 406 to be positioned over or near the user's ear. In addition, activation engine 418 can active screen or display hinge 412 and cause screen or display 410 to be positioned in front of or near the user's eye. Further, activation engine 418 can activate microphone hinge 416 and cause microphone 414 to be positioned in front of or near the user's mouth. In an example, electronic device 400 may be used in a gaming or virtual reality environment and activation engine 418 may be activated by a game or virtual reality environment. For example, if the user was playing a first-person shooter game and was hit or shot, display or screen may be a red tinted screen or black screen and activation engine 418 can active screen or display hinge 412 and cause screen or display 410 to be positioned in front of or near the user's eye to simulate the user being hit or blacked out.

Turning to FIG. 14, FIG. 14 is a simplified block diagram associated with an example SOC 1400 of the present disclosure. At least one example implementation of the present disclosure can include the low-profile hinge features discussed herein and a component. For example, the example of FIG. 14 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 14, SOC 1400 may include multiple cores 1406-1407, an L2 cache control 1408, a bus interface unit 1409, an L2 cache 1410, a graphics processing unit (GPU) 1415, an interconnect 1402, a video codec 1420, and a liquid crystal display (LCD) I/F 1425, which may be associated with mobile industry processor interface (MIPI)/high-definition multimedia interface (HDMI) links that couple to an LCD.

SOC 1400 may also include a subscriber identity module (SIM) I/F 1430, a boot read-only memory (ROM) 1435, a synchronous dynamic random access memory (SDRAM) controller 1440, a flash controller 1445, a serial peripheral interface (SPI) master 1450, a suitable power control 1455, a dynamic RAM (DRAM) 1460, and flash 1465. In addition, one or more example embodiments include one or more communication capabilities, interfaces, and features such as instances of Bluetooth™ 1470, a 3G modem 1475, a global positioning system (GPS) 1480, and an 802.11 WiFi 1485.

In operation, the example of FIG. 14 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe' Flash' Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 15:
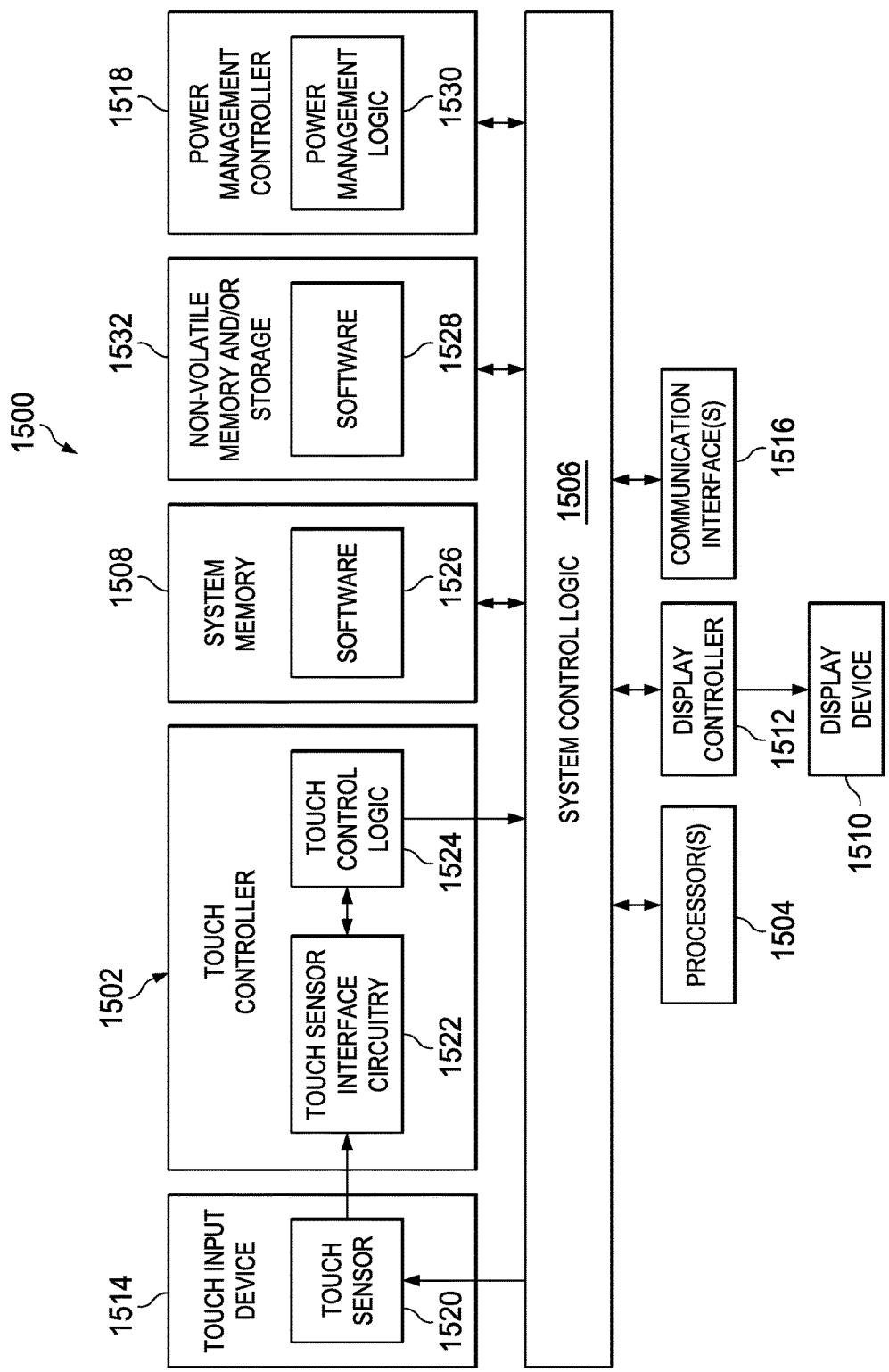
FIG. 15 is a simplified block diagram illustrating example logic that may be used to execute activities associated with the present disclosure.

Turning to FIG. 15, FIG. 15 is a simplified block diagram illustrating potential electronics and logic that may be associated with the electronic devices discussed herein. In at least one example embodiment, system 1500 can include a touch controller 1502, one or more processors 1504, system control logic 1506 coupled to at least one of processor(s) 1504, system memory 1508 coupled to system control logic 1506, non-volatile memory and/or storage device(s) 1532 coupled to system control logic 1506, display controller 1512 coupled to system control logic 1506, display controller 1512 coupled to a display device 1510, power management controller 1518 coupled to system control logic 1506, and/or communication interfaces 1516 coupled to system control logic 1506.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 1500 is part of a more generalized enclosure. In alternate implementations, instead of notebook device/laptops, etc., certain alternate embodiments deal with mobile phones, tablet devices, etc.

System control logic 1506, in at least one embodiment, can include any suitable interface controllers to provide for any suitable interface to at least one processor 1504 and/or to any suitable device or component in communication with system control logic 1506. System control logic 1506, in at least one embodiment, can include one or more memory controllers to provide an interface to system memory 1508. System memory 1508 may be used to load and store data and/or instructions, for example, for system 1500. System memory 1508, in at least one embodiment, can include any suitable volatile memory, such as suitable dynamic random access memory (DRAM) for example. System control logic 1506, in at least one embodiment, can include one or more I/O controllers to provide an interface to display device 1510, touch controller 1502, and non-volatile memory and/or storage device(s) 1532.

Non-volatile memory and/or storage device(s) 1532 may be used to store data and/or instructions, for example within software 1528. Non-volatile memory and/or storage device(s) 1532 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1518 may include power management logic 1530 configured to control various power management and/or power saving functions. In at least one example embodiment, power management controller 1518 is configured to reduce the power consumption of components or devices of system 1500 that may either be operated at reduced power or turned off when the electronic device is in a closed configuration. For example, in at least one embodiment, when the electronic device is in a closed configuration, power management controller 1518 performs one or more of the following: power down the unused portion of the display and/or any backlight associated therewith; allow one or more of processor(s) 1504 to go to a lower power state if less computing power is required in the closed configuration; and shutdown any devices and/or components that are unused when an electronic device is in the closed configuration.

Communications interface(s) 1516 may provide an interface for system 1500 to communicate over one or more networks and/or with any other suitable device. Communications interface(s) 1516 may include any suitable hardware and/or firmware. Communications interface(s) 1516, in at least one example embodiment, may include, for example, a network adapter, a wireless network adapter, a telephone modem, and/or a wireless modem. System control logic 1506, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 1504 may be packaged together with logic for one or more controllers of system control logic 1506. In at least one embodiment, at least one processor 1504 may be packaged together with logic for one or more controllers of system control logic 1506 to form a System in Package (SiP). In at least one embodiment, at least one processor 1504 may be integrated on the same die with logic for one or more controllers of system control logic 1506. For at least one embodiment, at least one processor 1504 may be integrated on the same die with logic for one or more controllers of system control logic 1506 to form a System on Chip (SoC).

For touch control, touch controller 1502 may include touch sensor interface circuitry 1522 and touch control logic 1524. Touch sensor interface circuitry 1522 may be coupled to detect, using a touch sensor 1520, touch input over a first touch surface layer and a second touch surface layer of a display (i.e., display device 1510). Touch sensor interface circuitry 1522 may include any suitable circuitry that may depend, for example, at least in part on the touch-sensitive technology used for a touch input device 1514. Touch sensor interface circuitry 1522, in one embodiment, may support any suitable multi-touch technology. Touch sensor interface circuitry 1522, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1524 may be coupled to help control touch sensor interface circuitry 1522 in any suitable manner to detect touch input over a first touch surface layer and a second touch surface layer. Touch control logic 1524 for at least one example embodiment may also be coupled to output in any suitable manner digital touch input data corresponding to touch input detected by touch sensor interface circuitry 1522. Touch control logic 1524 may be implemented using any suitable logic, including any suitable hardware, firmware, and/or software logic (e.g., non-transitory tangible media), that may depend, for example, at least in part on the circuitry used for touch sensor interface circuitry 1522. Touch control logic 1524 for at least one embodiment may support any suitable multi-touch technology.

Touch control logic 1524 may be coupled to output digital touch input data to system control logic 1506 and/or at least one processor 1504 for processing. At least one processor 1504 for at least one embodiment may execute any suitable software to process digital touch input data output from touch control logic 1524. Suitable software may include, for example, any suitable driver software and/or any suitable application software. As illustrated in FIG. 15, system memory 1508 may store suitable software 1526 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is a hinge that includes a first housing pinion that is coupled to a first housing, a first housing rack coupled to the first housing pinion, wherein the first housing rack is curved, a second housing pinion that is coupled to a second housing, and a second housing rack coupled to the second housing pinion.

In Example A2, the subject matter of Example A1 may optionally include a pinion guide, where the pinion guide has approximately the same curved profile as the first housing rack, where a portion of the first housing pinion can travel along the pinion guide.

In Example A3, the subject matter of any of the preceding 'A' Examples can optionally include a tension mechanism coupled to the first housing pinion.

In Example A4, the subject matter of any of the preceding 'A' Examples can optionally include where the second housing pinion and the second housing rack allow the second housing to move laterally relative to the first housing before the first housing is rotated relative to the second housing.

In Example A5, the subject matter of any of the preceding 'A' Examples can optionally include where the first housing can rotate about one-hundred and eighty degrees relative to the second housing.

In Example A6, the subject matter of any of the preceding 'A' Examples can optionally include where the first housing includes a curved display.

In Example A7, the subject matter of any of the preceding 'A' Examples can optionally include where the second housing is an electronic device.

Example AA1 can include an electronic device that includes a first housing, a second housing, and a hinge that rotatably couples the first housing to the second housing. The hinge can include a first housing pinion coupled to the first housing, a first housing rack coupled to the first housing pinion, where the first housing rack is curved, a second housing pinion coupled to the second housing, and a second housing rack coupled to the second housing pinion.

In Example AA2, the subject matter of any of the preceding 'AA' Examples can optionally include a pinion guide, where the pinion guide has approximately the same curved profile as the first housing rack, where a portion of the first housing pinion can travel along the pinion guide.

In Example AA3, the subject matter of any of the preceding 'AA' Examples can optionally include a tension mechanism coupled to the first housing pinion.

In Example AA4, the subject matter of any of the preceding 'AA' Examples can optionally include where the first housing can rotate about one-hundred and eighty degrees relative to the second housing.

In Example AA5, the subject matter of any of the preceding 'AA' Examples can optionally include where the second housing pinion and the second housing rack allow the second housing to move laterally relative to the first housing before the first housing is rotated relative to the second housing.

In Example AA6, the subject matter of any of the preceding 'AA' Examples can optionally include where the first housing includes a curved display.

In Example AA7, the subject matter of any of the preceding 'AA' Examples can optionally include where the second housing includes a keyboard.

Example M1 is a method that includes rotating a first housing relative to a second housing using a hinge. The hinge can include a first housing pinion that is coupled to the first housing, a first housing rack coupled to the first housing pinion, wherein the first housing rack is curved, a second housing pinion that is coupled to the second housing, and a second housing rack coupled to the second housing pinion.

In Example M2, the subject matter of any of the preceding 'M' Examples can optionally include where the hinge further includes a pinion guide, where the pinion guide has approximately the same curved profile as the first housing rack, where a portion of the first housing pinion can travel along the pinion guide.

In Example M3, the subject matter of any of the preceding 'M' Examples can optionally include where the hinge includes a tension mechanism coupled to the first housing pinion.

In Example M4, the subject matter of any of the preceding 'M' Examples can optionally include where the second housing pinion and the second housing rack allow the second housing to move laterally relative to the first housing before the first housing is rotated relative to the second housing.

In Example M5, the subject matter of any of the preceding 'M' Examples can optionally include where the first housing includes a curved display.

An example system S1 can include a processor, memory, a first housing, where the first housing includes a curved display, a second housing, where the second housing includes an input device, and a hinge that rotatably couples the first housing to the second housing. The hinge can include a first housing pinion that is coupled to the first housing, a first housing rack coupled to the first housing pinion, where the first housing rack is curved, a second housing pinion that is coupled to the second housing, and a second housing rack coupled to the second housing pinion.

In Example S2, the subject matter of any of the preceding 'S' Examples can optionally include a pinion guide, where the pinion guide has approximately the same curved profile as the first housing rack, where a portion of the first housing pinion can travel along the pinion guide.

In Example S3, the subject matter of any of the preceding 'S' Examples can optionally include a tension mechanism coupled to the first housing pinion.

In Example S4, the subject matter of any of the preceding 'S' Examples can optionally include the second housing pinion and the second housing rack allow the second housing to move laterally relative to the first housing before the first housing is rotated relative to the second housing.

In Example S5, the subject matter of any of the preceding 'S' Examples can optionally include where the first housing can rotate about one-hundred and eighty degrees relative to the second housing.

In Example S6, the subject matter of any of the preceding 'S' Examples can optionally include where the display is a curved display.

Example X1 is a machine-readable storage medium including machine-readable instructions to implement a method or realize an apparatus as in any one of the Examples A1-A8, AA1-AA6, M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A hinge, comprising:
   a first housing pinion that is coupled to a first housing;
   a first housing rack coupled to the first housing pinion, wherein the first housing rack is curved;
   a pinion guide, wherein the pinion guide has approximately the same curved profile as the first housing rack, wherein a portion of the first housing pinion can travel along the pinion guide;
   a second housing pinion that is coupled to a second housing; and
   a second housing rack coupled to the second housing pinion.

2. The hinge of claim 1, further comprising:
   a tension mechanism coupled to the first housing pinion.

3. The hinge of claim 1, wherein the second housing pinion and the second housing rack allow the second housing to move laterally relative to the first housing before the first housing is rotated relative to the second housing.

4. The hinge of claim 1, wherein the first housing can rotate about one-hundred and eighty degrees relative to the second housing.

5. The hinge of claim 1, wherein the first housing includes a curved display.

6. The hinge of claim 1, wherein the second housing is an electronic device.

7. An electronic device comprising:
   a first housing;
   a second housing; and
   a hinge that rotatably couples the first housing to the second housing, wherein the hinge includes:
   a first housing pinion coupled to the first housing;
   a first housing rack coupled to the first housing pinion, wherein the first housing rack is curved;
   a pinion guide, wherein the pinion guide has approximately the same curved profile as the first housing rack, wherein a portion of the first housing pinion can travel along the pinion guide;
   a second housing pinion coupled to the second housing; and
   a second housing rack coupled to the second housing pinion.

8. The electronic device of claim 7, wherein the hinge further includes:
   a tension mechanism coupled to the first housing pinion.

9. The electronic device of claim 7, wherein the first housing can rotate about one-hundred and eighty degrees relative to the second housing.

10. The electronic device of claim 9, wherein the second housing pinion and the second housing rack allow the second housing to move laterally relative to the first housing before the first housing is rotated relative to the second housing.

11. The electronic device of claim 7, wherein the first housing includes a curved display.

12. The electronic device of claim 7, wherein the second housing includes a keyboard.

13. A method, comprising:
    rotating a first housing relative to a second housing using a hinge, wherein the hinge includes:
    a first housing pinion that is coupled to the first housing;
    a first housing rack coupled to the first housing pinion, wherein the first housing rack is curved;
    a pinion guide, wherein the pinion guide has approximately the same curved profile as the first housing rack, wherein a portion of the first housing pinion can travel along the pinion guide;
    a second housing pinion that is coupled to the second housing; and
    a second housing rack coupled to the second housing pinion.

14. The method of claim 13, wherein the hinge further includes:
    a tension mechanism coupled to the first housing pinion.

15. The method of claim 13, wherein the second housing pinion and the second housing rack allow the second housing to move laterally relative to the first housing before the first housing is rotated relative to the second housing.

16. The method of claim 13, wherein the first housing includes a curved display.

17. A system, comprising:
    a processor;
    a first housing, wherein the first housing includes a display;
    a second housing, wherein the second housing includes an input device; and
    a hinge that rotatably couples the first housing to the second housing, wherein the hinge includes:
    a first housing pinion that is coupled to the first housing;
    a first housing rack coupled to the first housing pinion, wherein the first housing rack is curved;
    a pinion guide, wherein the pinion guide has approximately the same curved profile as the first housing rack, wherein a portion of the first housing pinion can travel along the pinion guide;
    a second housing pinion that is coupled to the second housing; and
    a second housing rack coupled to the second housing pinion.

18. The system of claim 17, wherein the hinge further includes:
a tension mechanism coupled to the first housing pinion.

19. The system of claim 17, wherein the second housing pinion and the second housing rack allow the second housing to move laterally relative to the first housing before the first housing is rotated relative to the second housing.

20. The system of claim 17, wherein the first housing can rotate about one-hundred and eighty degrees relative to the second housing.

21. The system of claim 17, wherein the display is a curved display.

* * * * *